United States Patent
Lacroix et al.

(10) Patent No.: US 10,741,189 B2
(45) Date of Patent: *Aug. 11, 2020

(54) LOW-FREQUENCY EFFECTS HAPTIC CONVERSION SYSTEM

(71) Applicant: Immersion Corporation, San Jose, CA (US)

(72) Inventors: Robert Lacroix, Saint-Lambert (CA); Satvir Singh Bhatia, Milpitas, CA (US); David Birnbaum, Oakland, CA (US); Christopher J. Ullrich, Ventura, CA (US); Amaya Becvar Weddle, San Luis Obispo, CA (US); Juan Manuel Cruz-Hernandez, Montreal (CA)

(73) Assignee: Immersion Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/685,058

(22) Filed: Aug. 24, 2017

(65) Prior Publication Data

US 2017/0352356 A1 Dec. 7, 2017

Related U.S. Application Data

(63) Continuation of application No. 15/337,209, filed on Oct. 28, 2016, now Pat. No. 9,786,287, which is a
(Continued)

(51) Int. Cl.
*H04R 5/00* (2006.01)
*G10L 19/018* (2013.01)
(Continued)

(52) U.S. Cl.
CPC ............ *G10L 19/018* (2013.01); *G06F 3/016* (2013.01); *G06F 3/165* (2013.01); *G10L 19/008* (2013.01);
(Continued)

(58) Field of Classification Search
CPC ..... G10L 19/018; G10L 19/008; G06F 3/016; G06F 3/165; H04R 3/14; H04R 2499/11;
(Continued)

(56) References Cited

U.S. PATENT DOCUMENTS

| 5,684,722 A | 11/1997 | Thorner et al. |
| 7,979,146 B2 | 7/2011 | Ullrich et al. |

(Continued)

FOREIGN PATENT DOCUMENTS

| CN | 1620327 A | 5/2005 |
| CN | 101416139 A | 4/2009 |

(Continued)

OTHER PUBLICATIONS

Sebastian Merchel et al., "Touch the Sound: Audio-Driven Tactile Feedback for Audio Mixing Applications", JAES, AES, 60 East 42nd Street, Room 2520 New York 10165-2520, USA, vol. 60, No. 1/2, Jan. 1, 2012, pp. 47-53, XP040574492.

(Continued)

*Primary Examiner* — Vivian C Chin
*Assistant Examiner* — Ammar T Hamid
(74) *Attorney, Agent, or Firm* — Medler Ferro Woodhouse & Mills PLLC

(57) ABSTRACT

Embodiments that generate multiple haptic effects receive a first haptic effect signal having a first priority and corresponding to a first haptic effect, and receive a second haptic effect signal having a second priority and corresponding to a second haptic effect. When the first priority is less than the second priority, embodiments generate an interaction parameter using the second haptic effect signal. When the second priority is less than the first priority, embodiments generate the interaction parameter using the first haptic effect signal. Embodiments then apply a drive signal to a haptic output device according to the interaction parameter, where the (Continued)

drive signal causes the first haptic effect and the second haptic effect to be generated by the haptic output device concurrently.

17 Claims, 33 Drawing Sheets

Related U.S. Application Data continuation of application No. 14/277,870, filed on May 15, 2014, now Pat. No. 9,519,346.

(60) Provisional application No. 61/824,442, filed on May 17, 2013.

(51) Int. Cl.
| | |
|---|---|
| *G06F 3/01* | (2006.01) |
| *H04S 3/00* | (2006.01) |
| *H04R 3/14* | (2006.01) |
| *G06F 3/16* | (2006.01) |
| *G10L 19/008* | (2013.01) |
| *H04S 7/00* | (2006.01) |
| *H03G 3/00* | (2006.01) |

(52) U.S. Cl.
CPC .............. *H04R 3/14* (2013.01); *H04S 3/008* (2013.01); *H04S 7/307* (2013.01); *H04R 2499/11* (2013.01); *H04S 2400/03* (2013.01); *H04S 2400/07* (2013.01)

(58) Field of Classification Search
CPC ...... H04S 3/008; H04S 7/307; H04S 2400/03; H04S 2400/07
USPC ............................................ 381/17, 306, 62
See application file for complete search history.

(56) References Cited

U.S. PATENT DOCUMENTS

| | | | |
|---|---|---|---|
| 7,982,588 B2 | 7/2011 | Makinen et al. | |
| 8,000,825 B2 | 8/2011 | Ullrich et al. | |
| 8,378,964 B2 | 2/2013 | Ullrich et al. | |
| 8,570,296 B2* | 10/2013 | Birnbaum | G06F 3/016 340/407.2 |
| 8,754,757 B1 | 6/2014 | Ullrich et al. | |
| 8,754,758 B1 | 6/2014 | Ullrich et al. | |
| 8,860,563 B2 | 10/2014 | Cruz-Hernandez et al. | |
| 9,092,059 B2 | 7/2015 | Bhatia | |
| 9,158,379 B2 | 10/2015 | Cruz-Hernandez et al. | |
| 9,245,429 B2 | 1/2016 | Cruz-Hernandez et al. | |
| 9,368,005 B2 | 6/2016 | Cruz-Hernandez et al. | |
| 9,443,401 B2 | 9/2016 | Weddle et al. | |
| 2006/0109256 A1* | 5/2006 | Grant | G06F 3/016 345/173 |
| 2006/0129719 A1* | 6/2006 | Cruz-Hernandez | G06F 3/016 710/58 |
| 2007/0236449 A1 | 10/2007 | Lacroix et al. | |
| 2009/0096632 A1 | 4/2009 | Ullrich et al. | |
| 2010/0066512 A1 | 3/2010 | Rank | |
| 2011/0191674 A1* | 8/2011 | Rawley | G06F 3/016 715/702 |
| 2011/0202155 A1 | 8/2011 | Ullrich et al. | |
| 2011/0215913 A1 | 9/2011 | Ullrich et al. | |
| 2012/0059491 A1 | 3/2012 | Carroll | |
| 2012/0206246 A1 | 8/2012 | Cruz-Hernandez et al. | |
| 2012/0206247 A1 | 8/2012 | Bhatia et al. | |
| 2012/0306631 A1 | 12/2012 | Hughes | |
| 2013/0131851 A1 | 5/2013 | Ullrich et al. | |
| 2013/0207917 A1 | 8/2013 | Cruz-Hernandez et al. | |
| 2013/0227410 A1 | 8/2013 | Sridhara et al. | |
| 2013/0265286 A1 | 10/2013 | Da Costa et al. | |
| 2014/0176415 A1* | 6/2014 | Buuck | G06F 3/016 345/156 |
| 2014/0267013 A1 | 9/2014 | Grant et al. | |
| 2014/0300454 A1 | 10/2014 | Lacroix et al. | |
| 2014/0315642 A1* | 10/2014 | Grant | A63F 13/06 463/38 |
| 2014/0315648 A1* | 10/2014 | Manzoor | F16F 15/1201 464/180 |
| 2015/0070260 A1 | 3/2015 | Saboune et al. | |
| 2015/0070261 A1 | 3/2015 | Saboune et al. | |
| 2015/0070269 A1* | 3/2015 | Bhatia | G06F 3/016 345/156 |
| 2015/0154966 A1* | 6/2015 | Bharitkar | G10L 19/008 381/23 |

FOREIGN PATENT DOCUMENTS

| | | |
|---|---|---|
| CN | 101828382 A | 9/2010 |
| CN | 102750957 A | 10/2012 |
| EP | 2487557 A2 | 8/2012 |
| EP | 2790099 A1 | 10/2014 |
| JP | H11-046391 A | 2/1999 |
| JP | h11-052490 A | 3/2011 |
| JP | 2012-050003 A | 3/2012 |
| JP | 2013-541264 A | 11/2013 |
| WO | 2011/043292 A1 | 4/2011 |
| WO | 2011043292 A1 | 4/2011 |
| WO | 2012028973 A1 | 3/2012 |
| WO | 2014099720 A1 | 6/2014 |

OTHER PUBLICATIONS

Juan Manuel Cruz-Hernandez et al., U.S. Appl. No. 14/080,860, filed Nov. 15, 2013.
Jamal Saboune et al., U.S. Appl. No. 14/020,461, filed Sep. 6, 2013.
Jamal Saboune et al., U.S. Appl. No. 14/020,502, filed Sep. 6, 2013.
Juan Manuel Cruz-Hernandez et al., U.S. Appl. No. 14/162,814, filed Jan. 24, 2014.
Henry Da Costa, U.S. Appl. No. 13/439,241, filed Apr. 4, 2012.
Satvir Singh Bhatia, U.S. Appl. No. 13/661,140, filed Oct. 26, 2012.
Christopher J. Ullrich, U.S. Appl. No. 13/785,166, filed Mar. 5, 2013.
Christopher J. Ullrich, U.S. Appl. No. 13/788,487, filed Mar. 7, 2013.
Juan Manuel Cruz-Hernandez, U.S. Appl. No. 13/803,778, filed Mar. 14, 2013.
Juan Manuel Cruz-Hernandez, U.S. Appl. No. 13/799,059, filed Mar. 13, 2013.
Amaya Becvar Weddle et al., U.S. Appl. No. 14/019,606, filed Sep. 6, 2013.
Robert Lacroix et al., U.S. Appl. No. 14/246,817, filed Apr. 7, 2014.
Wikipedia, "Low-Frequency Effects", http://en.wikipedia.org/wiki/Low-frequency.sub.--effects, last downloaded May 14, 2014.
Dolby, "What is the LFE channel?", http://www.dolby.com/uploadedFiles/Assets/US/Doc/Professional/38.sub.--LF-E.pdf, last downloaded May 14, 2014.
Takayuki Iwamoto et al., "Non-contact Method for Producing Tactile Sensation Using Airborne Ultrasound", Eurohaptics 2008, LNCS 5024, pp. 504-513.
M. Biet et al., "New Tactile Devices Using Piezoelectric Actuators", Actuator 2006, 10th International Conference on New Actuators, Jun. 14-16, 2006, Bremen, Germany.
Kent Walker et al., "Perception of Audio-Generated and Custom Motion Programs in Multimedia Display of Action-Oriented DVD Films", Jan. 1, 2006, Haptic and Audio Interaction Design Lecture Notes in Computer Science; LNCS, Springer, Berlin, DE, pp. 1-11, XP019038976.
Dolby, "What is the LFE channel?", Jan. 1, 2000, XP055159947, retrieved from the internet: URL: http://www.dolby.com/uploadedFiles/Assets/US/Doc/Professional/38.sub.--LF- E.pdf [retrieved on Jan. 5, 2015].
Any Information that are not Included With this Information Dislcosuire Staement can be Found in U.S. Appl. No. 14/277,870 and U.S. Appl. No. 15/337,209.

(56) References Cited

OTHER PUBLICATIONS

Dolby, "What is the LFE channel?", http://www.dolby.com/uploadedFiles/Assets/US/Doc/Professional/38_LFE.pdf, last downloaded May 14, 2014.
Sebastian Merchel et al., "Touch the Sound: Audio-Driven Tactile Feedback for Audio Mixing Applications", JAES, AES, 60 East 42nd Street, Room 2520 New York 10165-2520, USA, vol. 60, No. 112, Jan. 1, 2012, pp. 47-53, XP040574492.
Wikipedia, "Low-Frequency Effects", http://en.wikipedia.org/wiki/Low-frequency_effects, last downloaded May 14, 2014.
Any information that are not included with this Information Disclosure Statement can be found in U.S. Appl. No. 15/337,209.
Notification of First Office Action dated Feb. 26, 2018 in corresponding Chinese Patent Application No. 201410210293.6.
First Office Action issued in corresponding Chinese Patent Appl. No. 201610391467.2, dated Jul. 20, 2018.
Communication pursuant to Article 94(3) EPC issued in corresponding European Patent Appl. No. 17156665.6, dated Jul. 26, 2018.
Notice of Reasons for Rejection issued in Japanese Patent Application No. 2018-209783, dated Feb. 5, 2019.
Notification of the First Office Action issued in Chinese Application No. 201811616161.8 dated Aug. 2, 2019.
Office Action dated Mar. 12, 2020 in Chinese Patent Application No. 201811616161.8 (with computer-machine English translation.).

\* cited by examiner

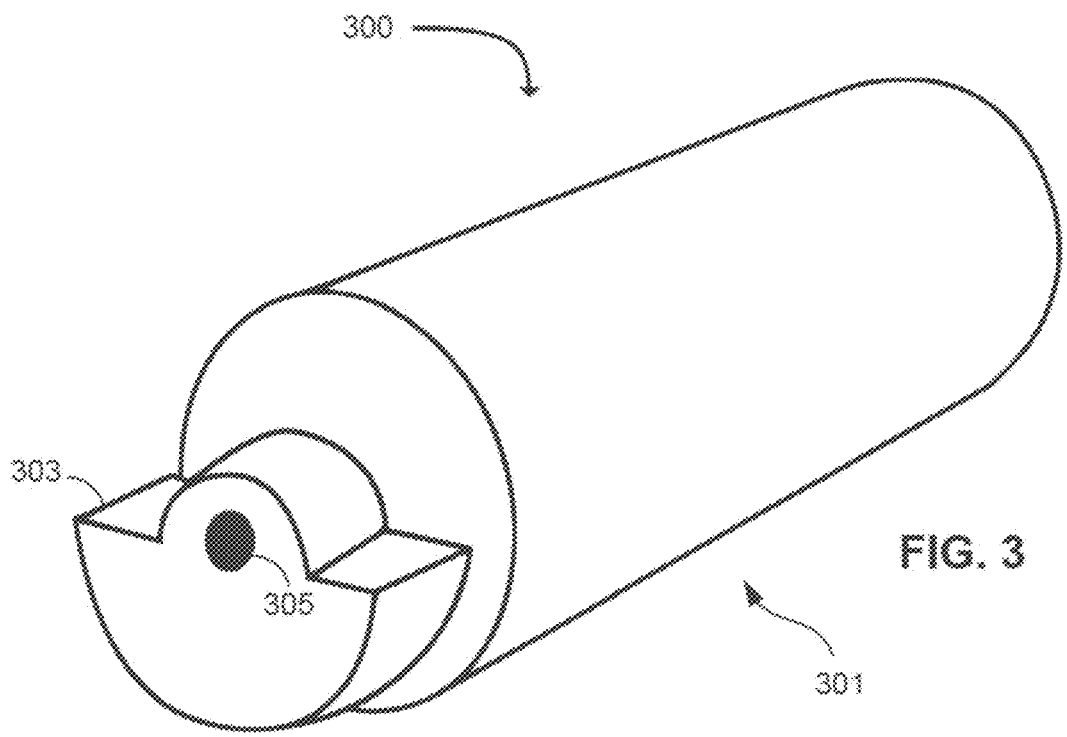
FIG. 3
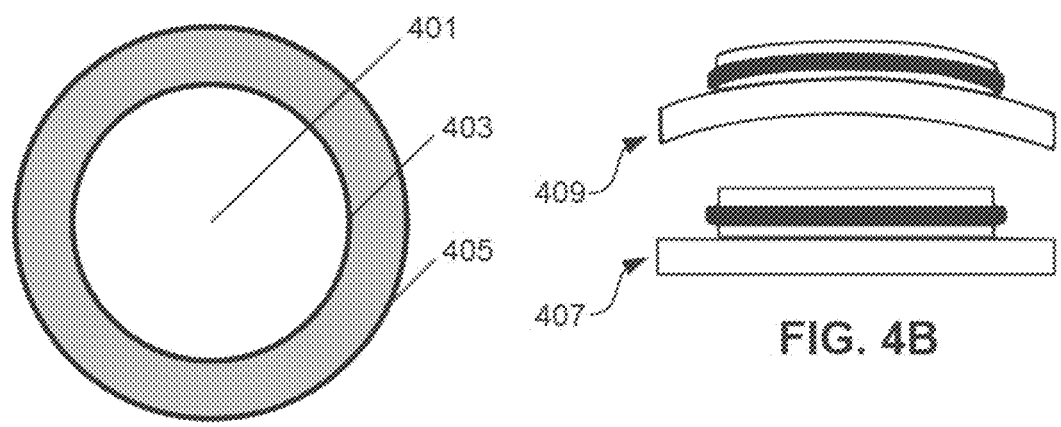
FIG. 4A
FIG. 4B
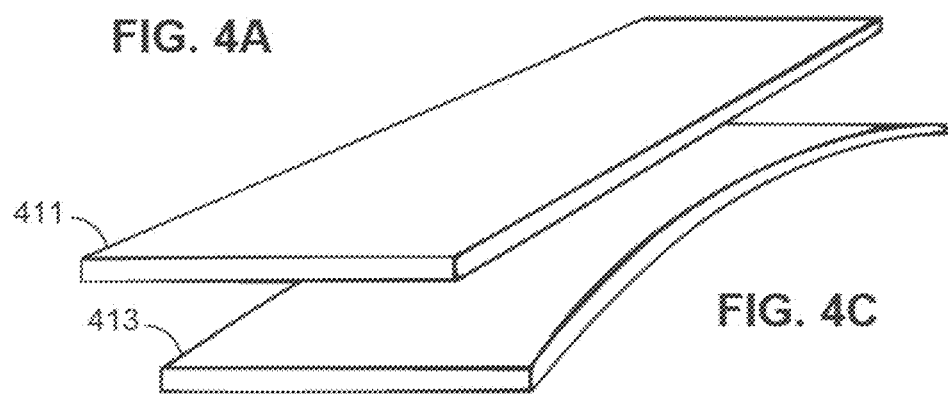
FIG. 4C

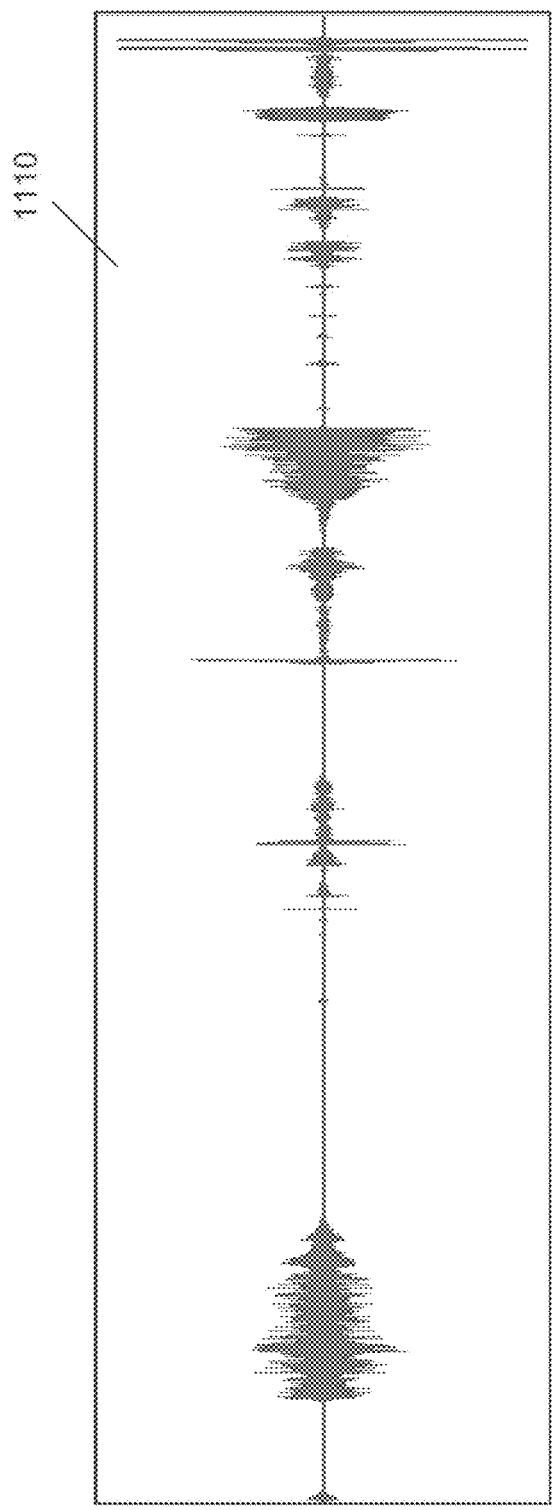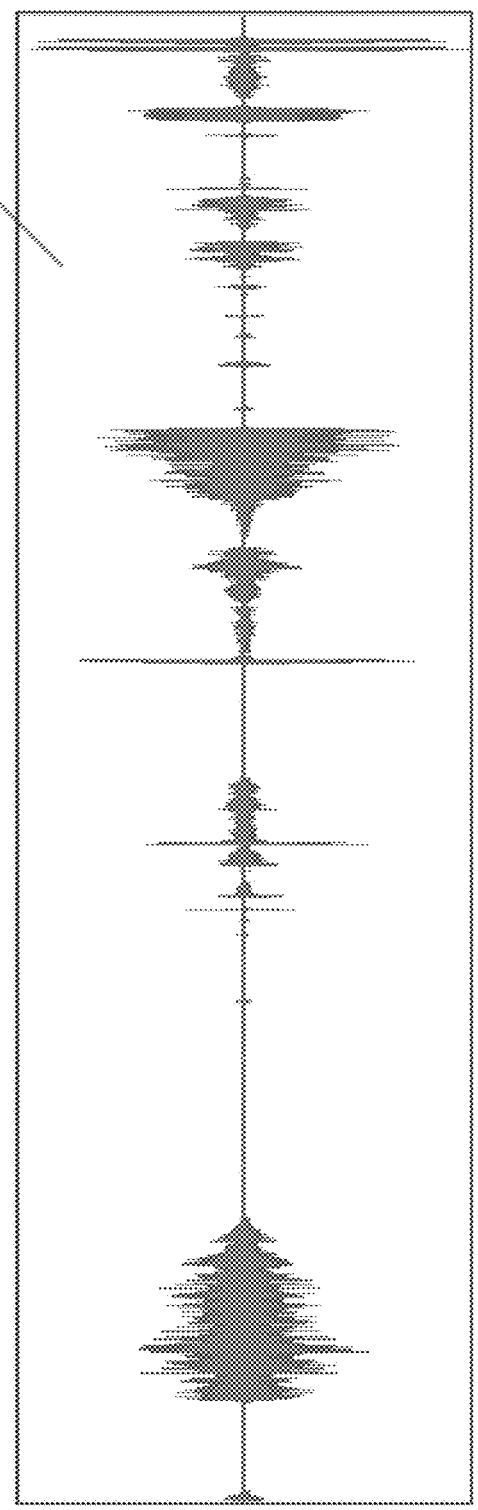

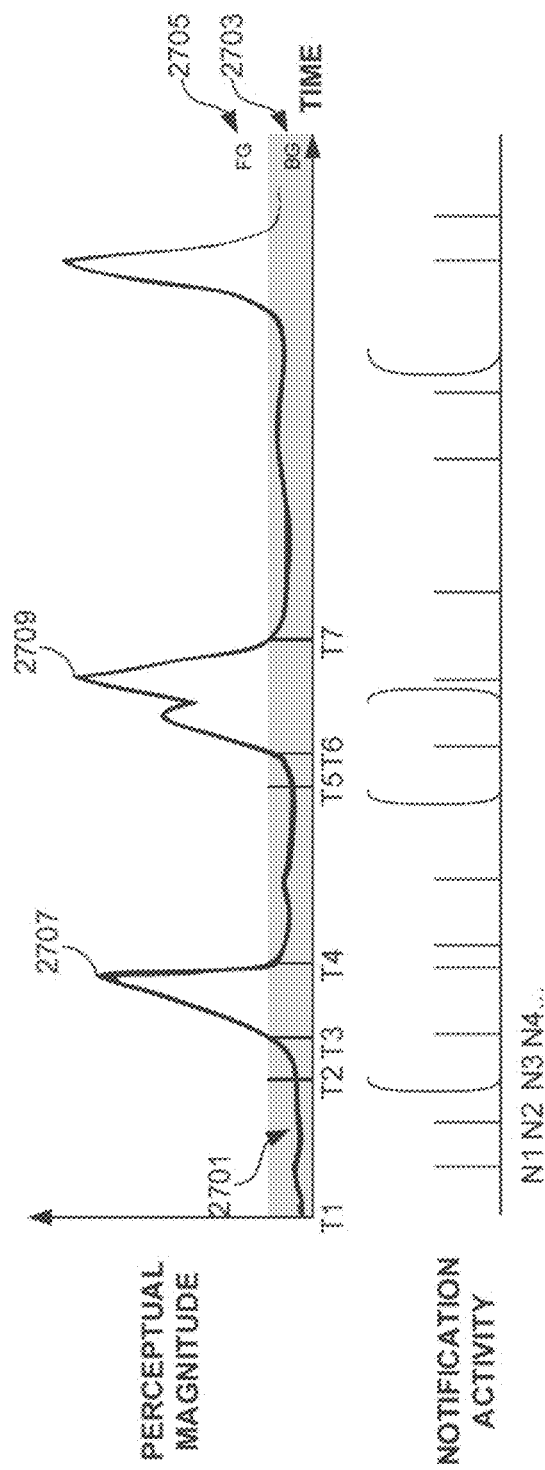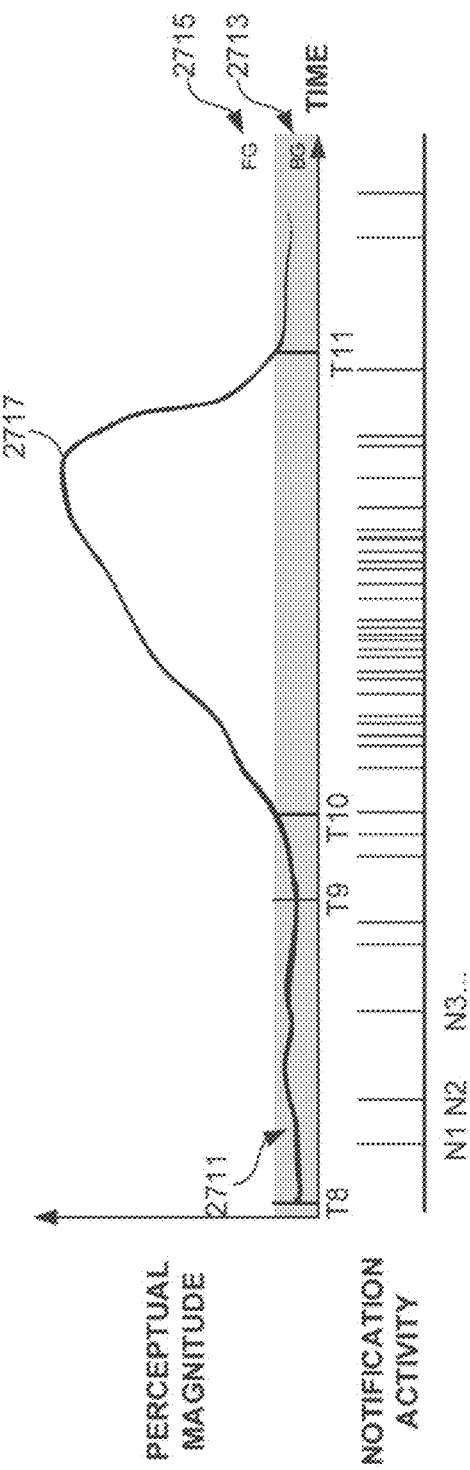

LOW-FREQUENCY EFFECTS HAPTIC CONVERSION SYSTEM

CROSS-REFERENCE TO RELATED APPLICATIONS

This application is a continuation of U.S. patent application Ser. No. 15/337,209, filed on Oct. 28, 2016, which is a continuation of U.S. patent application Ser. No. 14/277,870, filed on May 15, 2014 and issued as U.S. Pat. No. 9,519,346 on Dec. 13, 2016, which claims priority to U.S. Provisional Patent Application Ser. No. 61/824,442, filed on May 17, 2013. The disclosure of each of these applications is hereby incorporated by reference.

FIELD

One embodiment is directed generally to a device, and more particularly, to a device that produces haptic effects.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

In order to generate vibration effects, many devices utilize some type of actuator or haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Haptic output devices also broadly include non-mechanical or non-vibratory devices such as those that use electrostatic friction ("ESF"), ultrasonic surface friction ("USF"), or those that induce acoustic radiation pressure with an ultrasonic haptic transducer, or those that use a haptic substrate and a flexible or deformable surface, or those that provide projected haptic output such as a puff of air using an air jet, and so on.

Within the film and television industries, improved multi-channel audio systems have been developed in order to provide a more engaging experience for viewers. For example, an analog six channel surround sound multichannel audio system referred to as "5.1" was first developed by Dolby Laboratories, Inc., for 70 mm theatrical film screenings, providing three screen channels, two surround channels and a low-frequency enhancement channel. Later, a digital version of 5.1 multi-channel audio referred to as "Dolby Digital" was developed for 35 mm film, and, subsequently, a similar 5.1 system was developed by DTS, Inc. Since then, various multi-channel audio formats have been developed to include 6.1, or 7.1 source material and output up to 11.1 channels and beyond, and multi-channel audio is now included with almost all DVD, Blu-ray, broadcast and streaming video content for home viewing.

With the development of recent high resolution mobile devices such as smart phones and tablets, users are now able to view high definition audio and video on a handheld device that traditionally could only be seen in movie theaters, television or home theater systems. With haptically enabled mobile devices, experience has shown that content viewing is sufficiently enhanced, and viewers like it, if there is a haptic content component in addition to the audio and video content components.

SUMMARY

One embodiment generates multiple haptic effects. Embodiments receive a first haptic effect signal having a first priority and corresponding to a first haptic effect, and receive a second haptic effect signal having a second priority and corresponding to a second haptic effect. When the first priority is less than the second priority, embodiments generate an interaction parameter using the second haptic effect signal. When the second priority is less than the first priority, embodiments generate the interaction parameter using the first haptic effect signal. Embodiments then apply a drive signal to a haptic output device according to the interaction parameter, where the drive signal causes the first haptic effect and the second haptic effect to be generated by the haptic output device concurrently.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 3 is a cut-away perspective view of an ERM implementation of a haptic actuator according to one embodiment of the invention.

FIGS. 4A-4C are views of a piezoelectric implementation of a haptic actuator according to one embodiment of the invention.

FIGS. 11A and 11B are audio spectrograms showing a shifted, amplified and compressed audio signal according to one embodiment of the invention.

FIGS. 27A and 27B are display graphs of example multiple data channels of haptic feedback according to one embodiment of the invention.

DETAILED DESCRIPTION

Figure 1:
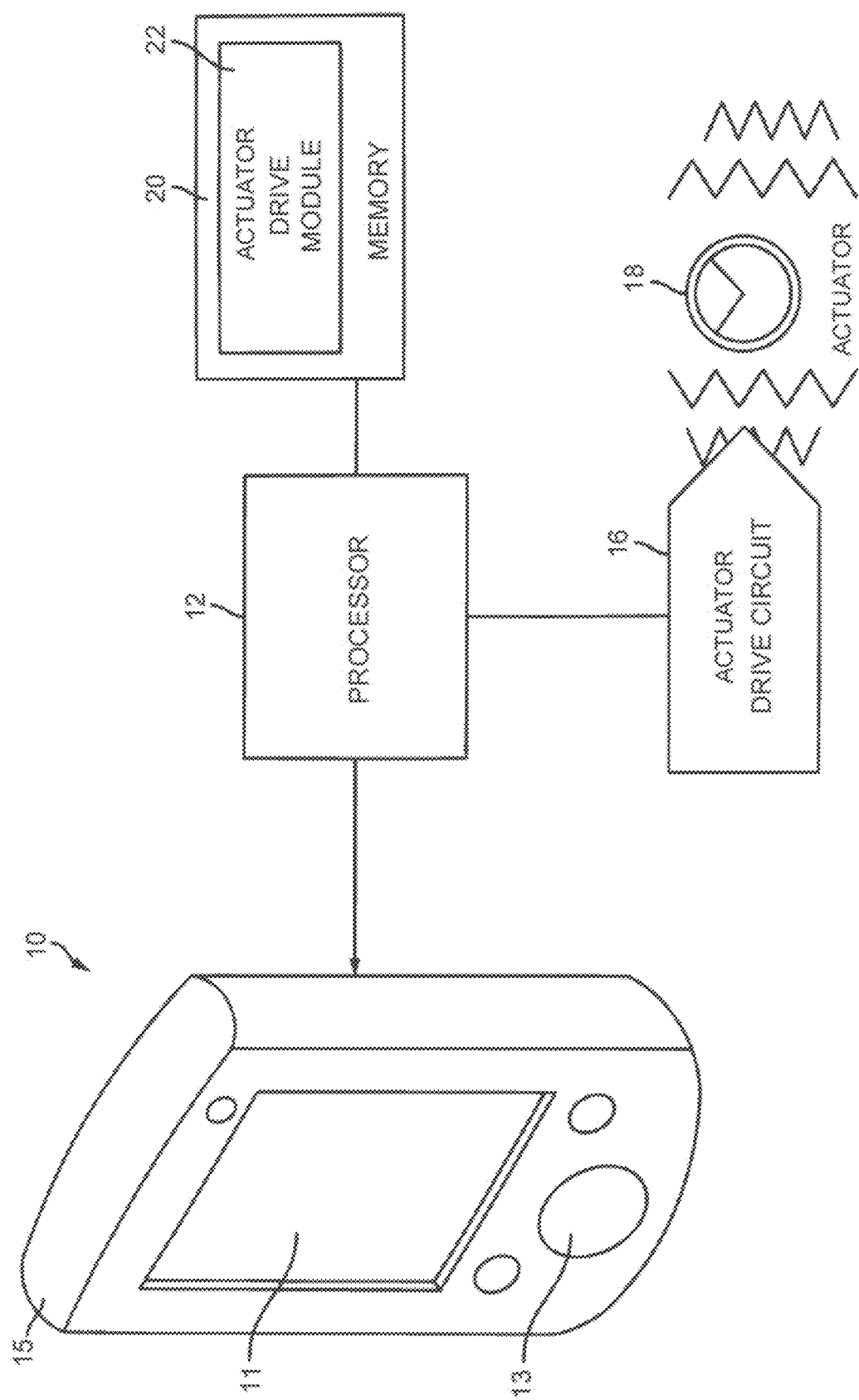
FIG. 1 is a block diagram of a haptically-enabled system according to one embodiment of the invention.

One embodiment is a system that extracts a low-frequency effects ("LFE") audio signal from a source audio signal and converts the extracted LFE audio signal into a haptic signal, where the haptic signal causes a haptic output device, such as an actuator, to output one or more haptic effects. By converting the extracted LFE audio signal into the haptic signal, the audio signal frequencies can be shifted to frequencies within a target frequency range of the haptic output device. Alternatively, by converting the extracted LFE audio signal into the haptic signal, the audio signal pitch can be shifted to a pitch within a target pitch range of the haptic output device. In embodiments where the conversion of the extracted LFE audio signal into the haptic signal is "offline," the haptic signal can be encoded and stored within a format, such as a storage device, or the haptic signal can be encoded and stored within the LFE audio signal that is included within the source audio signal. Alternatively, in embodiments where the conversion of the extracted LFE audio signal into the haptic signal is "online," the haptic signal can be sent to the haptic output device in real-time or near real-time, where one or more haptic effects are output in real-time or near real-time. In certain embodiments, the source audio signal can be replaced by another type of input signal, and the LFE audio signal can be replaced by another type of LFE signal. Further, in an alternate embodiment, the system can convert the extracted LFE audio signal into a plurality of haptic signals (either simultaneously or sequentially), where the haptic signals cause a plurality of haptic output devices (e.g., actuators) to output one or more haptic effects. In this alternate embodiment, each haptic output device can have a distinct target frequency range, and, for each conversion, the audio signal frequencies of the extracted LFE audio signal can be shifted to frequencies within each target frequency range of each haptic output device.

As described below, a LFE channel is any audio channel that has been encoded with an audio spectrum substantially less than the full spectrum of human auditory perception. An LFE track is typically used to encode low frequency information with audible frequencies in the range of 20 Hz-120 Hz, but may include any other audio signal with a limited frequency range such as a high frequency range sent to a "tweeter" speaker or a mid-range frequency range sent to a "squawker" speaker, or a low frequency range sent to a "woofer" speaker. Various popular audio encodings support this type of track. It is commonly referred to as the '0.1' in a 5.1, 7.1 or 11.1 surround sound audio track. The DVD and Blu-Ray standards specify the inclusion of an LFE track in consumer encodings. The LFE track is also used in surround sound video games, particularly, but not necessarily, those on 3rd generation gaming consoles such as Sony PS3, or Microsoft XBOX 360. In this case the LFE track is generated in real time through the use of an audio spatialization engine that synthesizes the 5.1 surround audio channels in real time depending on the game state such as the orientation of the player.

Traditional automated haptic playback architectures can provide haptic output based on an audio signal. Authored content by a haptic effects professional can in many cases provide for a more compelling content viewing experience than automated haptic generation from an audio signal, but it is expensive because it requires a relatively large amount of time to author the hundreds or thousands of haptic effects for long-form content. Therefore, there is a need for an improved system of automatically providing haptic effects from an LFE audio signal that does not require the same amount of time as authored haptic long-form content.

Because an LFE audio signal is typically intended to be reproduced using an audio output device configured to handle low-frequency signals, the data contained within the LFE audio signal is particularly well-suited to conversion to a haptic signal. For example, an LFE audio signal is already filtered and mixed to contain low-frequency (or limited-frequency) audio, but at a full bit rate. Further, an LFE audio signal is typically leveled by a content producer to have more correct amplitude with respect to other audio channels of an audio signal. In addition, an LFE audio signal typically contains the creative content component that is most natural for haptic-content experiences.

Unlike normal stereo audio data, LFE audio data translates naturally to a haptic signal. In stereo audio (or full range audio), it is generally necessary to filter and extract out those signal components that are most appropriate for haptic rendering. However, this can be a challenging operation which can result in inconsistent haptic experiences. The conversion of an LFE audio signal into a haptic signal is further described below in greater detail.

FIG. 1 is a block diagram of a haptically-enabled system 10 according to one embodiment of the invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11.

The haptic feedback system includes a processor 12. Coupled to processor 12 is a memory 20 and an actuator drive circuit 16, which is coupled to a haptic actuator 18. In certain embodiments, actuator 18 can be replaced with another type of haptic output device. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered dynamic if it includes some variation of these parameters when the haptic effect is generated or a variation of these parameters based on a user's interaction.

Processor 12 outputs the control signals to drive circuit 16 which includes electronic components and circuitry used to supply actuator 18 with the required electrical current and voltage to cause the desired haptic effects. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes an actuator drive module 22 which are instructions that, when executed by processor 12, generate drive signals for actuator 18 while also determining feedback from actuator 18 and adjusting the drive signals accordingly. In certain embodiments, actuator drive module 22 can be a low-frequency effects conversion module that can generate drive signals based on low-frequency effects audio signals. These drive signals are also identified as haptic signals. The functionality of module 22 is discussed in more detail below. Memory 20 may also be located internal to processor 12, or any combination of internal and external memory.

Touch surface 11 recognizes touches, and may also recognize the position and magnitude or pressure of touches on the surface, such as the number of touches, the size of the contact points, pressure, etc. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such as a cellular telephone, PDA, computer tablet, gaming console, wearable device, etc. or may be any other type of device that provides a user interface and includes a haptic effect system that includes one or more ERMs, LRAs, electrostatic or other types of actuators. The user interface may be a touch sensitive surface, or can be any other type of user interface such as a mouse, touchpad, mini-joystick, scroll wheel, trackball, game pads or game controllers, etc. In embodiments with more than one actuator, each actuator may have a different output capability in order to create a wide range of haptic effects on the device. Each actuator may be any type of haptic actuator or a single or multidimensional array of actuators.

Figure 2:
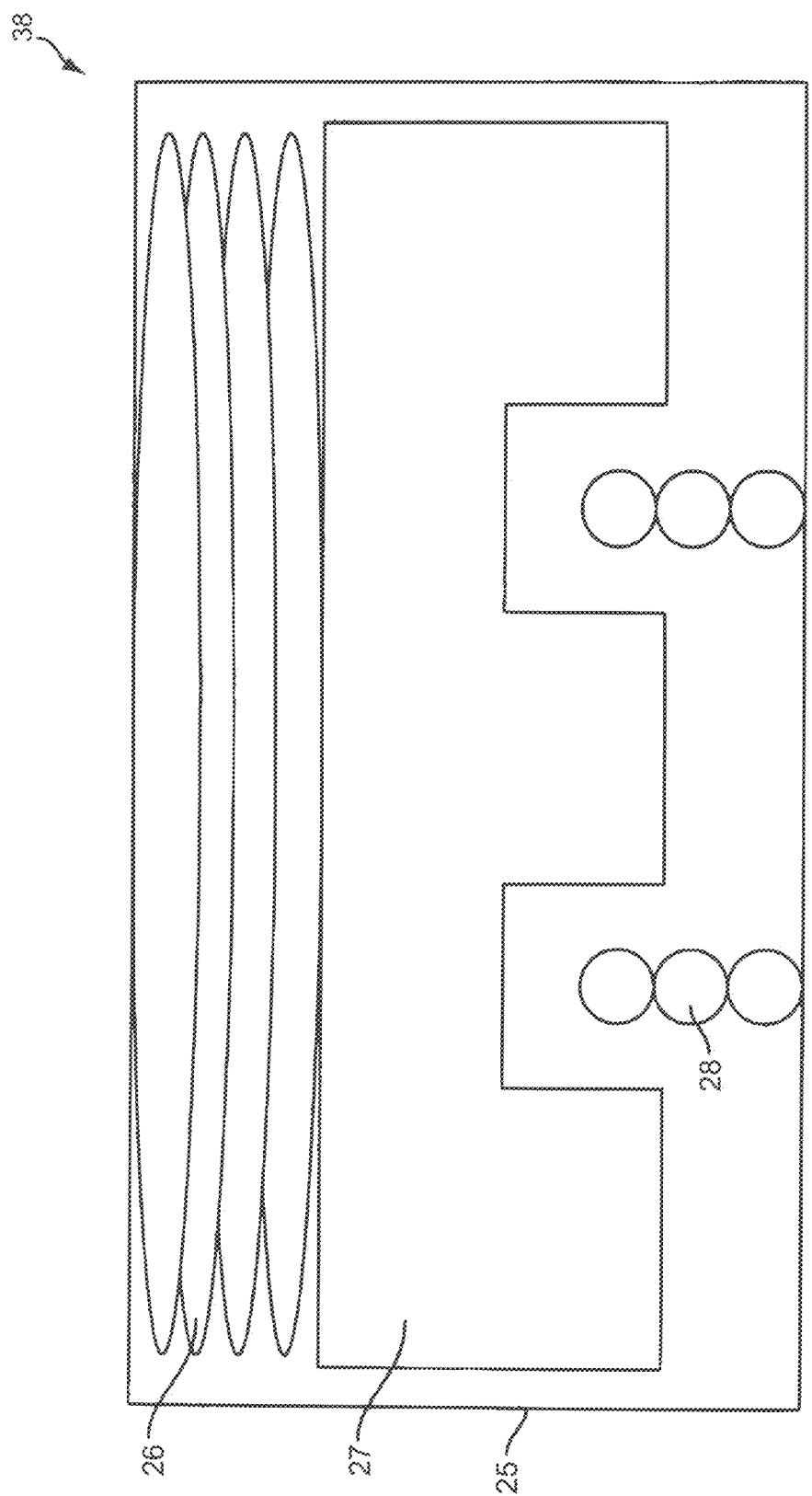
FIG. 2 is a cut-away perspective view of an LRA implementation of a haptic actuator according to one embodiment of the invention.

FIG. 2 is a cut-away side view of an LRA implementation of actuator 18 in accordance to one embodiment. LRA 38 includes a casing 25, a magnet/mass 27, a linear spring 26, and an electric coil 28. Magnet 27 is mounted to casing 25 by spring 26. Coil 28 is mounted directly on the bottom of casing 25 underneath magnet 27. LRA 38 is typical of any known LRA. In operation, when current flows through coil 28 a magnetic field forms around coil 28 which in interaction with the magnetic field of magnet 27 pushes or pulls on magnet 27. One current flow direction/polarity causes a push action and the other a pull action. Spring 26 controls the up and down movement of magnet 27 and has a deflected up position where it is compressed, a deflected down position where it is expanded, and a neutral or zero-crossing position where it is neither compressed or deflected and which is equal to its resting state when no current is being applied to coil 28 and there is no movement/oscillation of magnet 27.

For LRA 38, a mechanical quality factor or "Q factor" can be measured. In general, the mechanical Q factor is a dimensionless parameter that compares a time constant for decay of an oscillating physical system's amplitude to its oscillation period. The mechanical Q factor is significantly affected by mounting variations. The mechanical Q factor represents the ratio of the energy circulated between the mass and spring over the energy lost at every oscillation cycle. A low Q factor means that a large portion of the energy stored in the mass and spring is lost at every cycle. In general, a minimum Q factor occurs with system 10 is held firmly in a hand due to energy being absorbed by the tissues of the hand. The maximum Q factor generally occurs when system 10 is pressed against a hard and heavy surface that reflects all of the vibration energy back into LRA 38.

In direct proportionality to the mechanical Q factor, the forces that occur between magnet/mass 27 and spring 26 at resonance are typically 10-100 times larger than the force that coil 28 must produce to maintain the oscillation. Consequently, the resonant frequency of LRA 38 is mostly defined by the mass of magnet 27 and the compliance of spring 26. However, when an LRA is mounted to a floating device (i.e., system 10 held softly in a hand), the LRA resonant frequency shifts up significantly. Further, significant frequency shifts can occur due to external factors affecting the apparent mounting weight of LRA 38 in system 10, such as a cell phone flipped open/closed or the phone held tightly.

FIG. 3 is a cut-away perspective view of an ERM implementation of actuator 18 according to one embodiment of the invention. ERM 300 includes a rotating mass 301 having an off-center weight 303 that rotates about an axis of rotation 305. In operation, any type of motor may be coupled to ERM 300 to cause rotation in one or both directions around the axis of rotation 305 in response to the amount and polarity of voltage applied to the motor. It will be recognized that an application of voltage in the same direction of rotation will have an acceleration effect and cause the ERM 300 to increase its rotational speed, and that an application of voltage in the opposite direction of rotation will have a braking effect and cause the ERM 300 to decrease or even reverse its rotational speed.

One embodiment of the present invention provides haptic feedback by determining and modifying the angular speed of ERM 300. Angular speed is a scalar measure of rotation rate, and represents the magnitude of the vector quantity angular velocity. Angular speed or frequency ω, in radians per second, correlates to frequency v in cycles per second, also called Hz, by a factor of 2π. The drive signal includes a drive period where at least one drive pulse is applied to ERM 300, and a monitoring period where the back electromagnetic field ("EMF") of the rotating mass 301 is received and used to determine the angular speed of ERM 300. In another embodiment, the drive period and the monitoring period are concurrent and the embodiment of the invention dynamically determines the angular speed of ERM 300 during both the drive and monitoring periods.

FIGS. 4A-4C are views of a piezoelectric implementation of a haptic actuator 18 according to one embodiment of the invention. FIG. 4A shows a disk piezoelectric actuator that includes an electrode 401, a piezo ceramics disk 403 and a metal disk 405. As shown in FIG. 4B, when a voltage is applied to electrode 401, the piezoelectric actuator bends in response, going from a relaxed state 407 to a transformed state 409. When a voltage is applied, it is that bending of the actuator that creates the foundation of vibration. Alternatively, FIG. 4C shows a beam piezoelectric actuator that operates similarly to a disk piezoelectric actuator by going from a relaxed state 411 to a transformed state 413.

Figure 5:
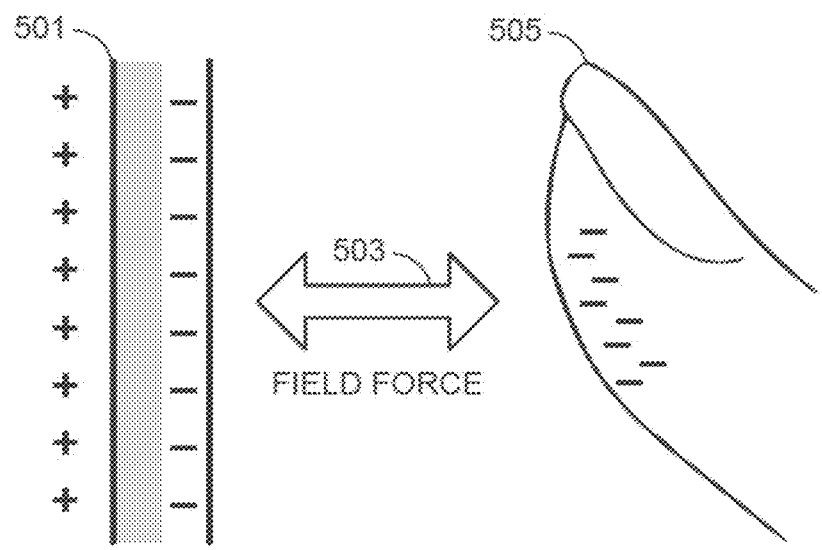
FIG. 5 is a view of a haptic device using electrostatic friction ("ESF") according to one embodiment of the invention.

FIG. 5 is a view of a haptic device using ESF according to one embodiment of the invention. The embodiment is based on the discovery that subcutaneous Pacinian corpuscles can be stimulated by means of a capacitive electrical coupling and an appropriately dimensioned control voltage, either without any mechanical stimulation of the Pacinian corpuscles or as an additional stimulation separate from such mechanical stimulation. An appropriately dimensioned high voltage is used as the control voltage. In the present context, a high voltage means such a voltage that direct galvanic contact must be prevented for reasons of safety and/or user comfort. This results in a capacitive coupling between the Pacinian corpuscles and the apparatus causing the stimulation, wherein one side of the capacitive coupling is formed by at least one galvanically isolated electrode connected to the stimulating apparatus, while the other side, in close proximity to the electrode, is formed by the body member, preferably a finger, of the stimulation target, such as the user of the apparatus, and more specifically the subcutaneous Pacinian corpuscles.

It likely that an embodiment of the invention is based on a controlled formation of an electric field between an active surface of the apparatus and the body member, such as a finger, approaching or touching it. The electric field tends to give rise to an opposite charge on the proximate finger. A local electric field and a capacitive coupling can be formed between the charges. The electric field directs a force on the charge of the finger tissue. By appropriately altering the electric field a force capable of moving the tissue may arise, whereby the sensory receptors sense such movement as vibration.

As shown in FIG. 5, one or more conducting electrodes 501 are provided with an insulator. When a body member such as finger 505 is proximate to the conducting electrode 501, the insulator prevents flow of direct current from the conducting electrode to the body member 505. A capacitive coupling field force 503 over the insulator is formed between the conducting electrode 501 and the body member 505. The apparatus also comprises a high-voltage source for applying an electrical input to the one or more conducting electrodes, wherein the electrical input comprises a low-frequency component in a frequency range between 10 Hz-1000 Hz. The capacitive coupling and electrical input are dimensioned to produce an electrosensory sensation which is produced independently of any mechanical vibration of the one or more conducting electrodes or insulators.

Figure 6:
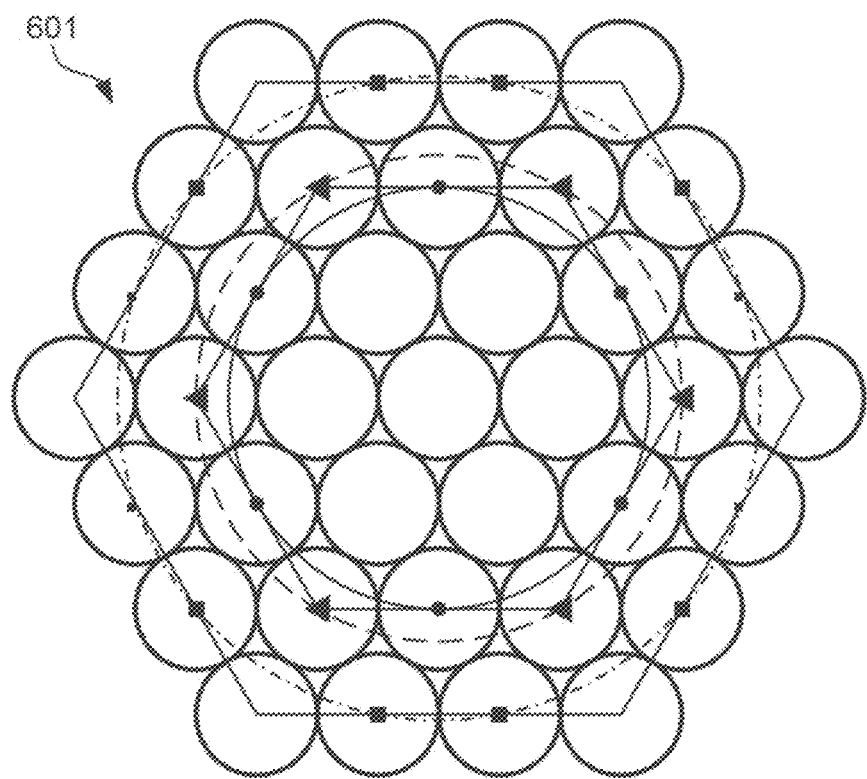
FIG. 6 is a view of a haptic device for inducing acoustic radiation pressure with an ultrasonic haptic transducer according to one embodiment of the invention.

FIG. 6 is a view of a haptic device for inducing acoustic radiation pressure with an ultrasonic haptic transducer. An airborne ultrasound transducer array 601 is designed to provide tactile feedback in three-dimensional ("3D") free space. The array radiates airborne ultrasound, and produces high-fidelity pressure fields onto the user's hands without the use of gloves or mechanical attachments. The method is based on a nonlinear phenomenon of ultrasound; acoustic radiation pressure. When an object interrupts the propagation of ultrasound, a pressure field is exerted on the surface of the object. This pressure is called acoustic radiation pressure. The acoustic radiation pressure P [Pa] is simply described as P=αE, where E [J=m$^3$] is the energy density of the ultrasound and α is a constant ranging from 1 to 2 depending on the reflection properties of the surface of the object. The equation describes how the acoustic radiation pressure is proportional to the energy density of the ultrasound. The spatial distribution of the energy density of the ultrasound can be controlled by using the wave field synthesis techniques. With an ultrasound transducer array, various patterns of pressure field are produced in 3D free space. Unlike air-jets, the spatial and temporal resolutions are quite fine. The spatial resolution is comparable to the wavelength of the ultrasound. The frequency characteristics are sufficiently fine up to 1 KHz.

The airborne ultrasound can be applied directly onto the skin without the risk of the penetration. When the airborne ultrasound is applied on the surface of the skin, due to the large difference between the characteristic acoustic impedance of the air and that of the skin, about 99.9% of the incident acoustic energy is reflected on the surface of the skin. Hence, this tactile feedback system does not require the users to wear any clumsy gloves or mechanical attachments.

Figure 7:
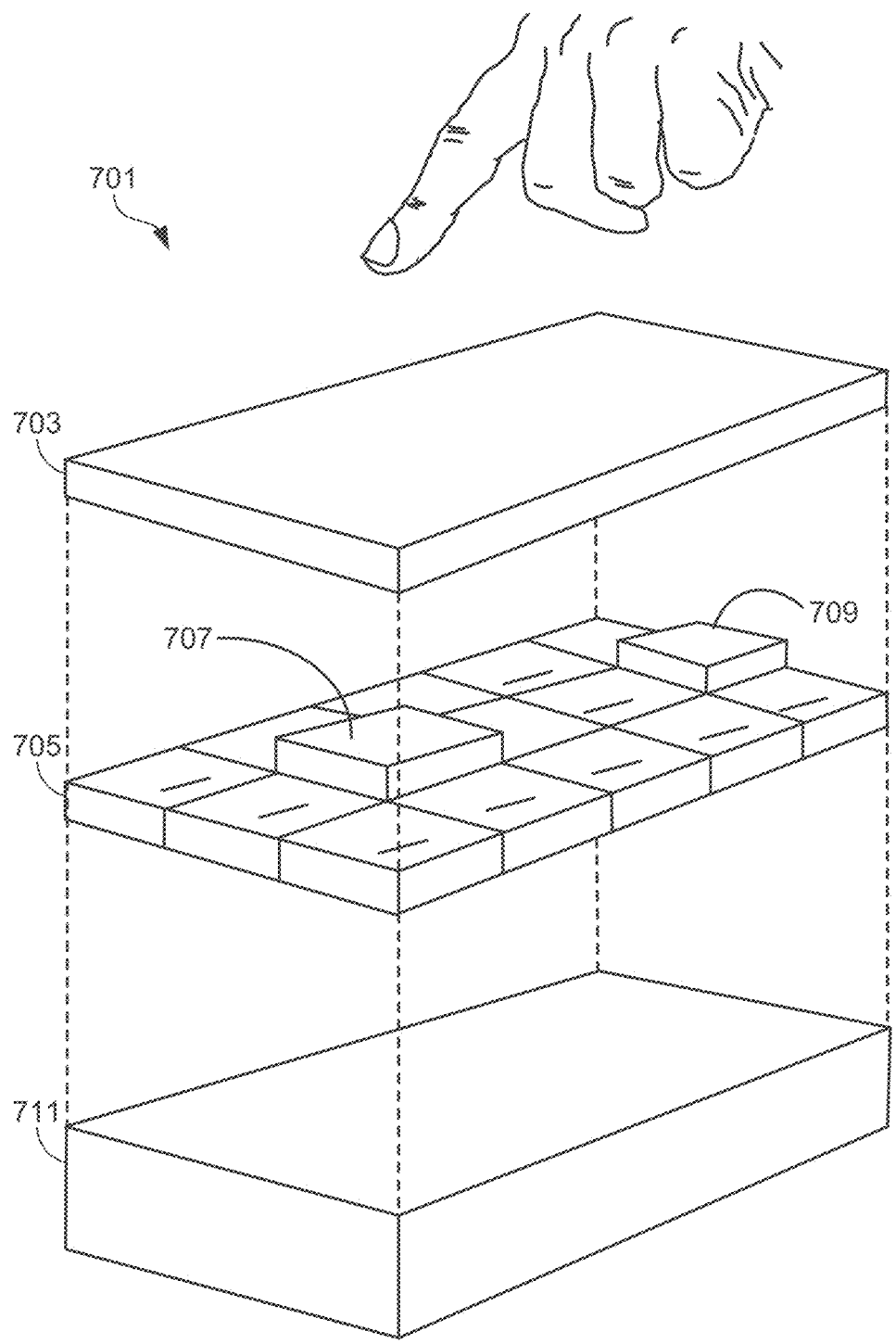
FIG. 7 is a view of a haptic device using a haptic substrate and flexible or deformable surface according to one embodiment of the invention.

FIG. 7 shows a three-dimensional ("3D") diagram illustrating a haptic device 701 using a haptic substrate and a flexible surface in accordance with one embodiment of the invention. Device 701 includes a flexible surface layer 703, a haptic substrate 705, and a deforming mechanism 711. It should be noted that device 701 can be a user interface device, such as an interface for a cellular phone, a personal digital assistant ("PDA"), an automotive data input system, and so forth. It should be further noted that the underlying concept of the exemplary embodiment of the invention would not change if one or more blocks (circuits or layers) were added to or removed from device 701.

Flexible surface layer 703, in one instance, is made of soft and/or elastic materials such as silicone rubber, which is also known as polysiloxane. A function of the flexible surface layer 703 is to change its surface shape or texture upon contact with the physical pattern of haptic substrate 705. The physical pattern of haptic substrate 705 is variable as one or more of the local features of haptic substrate 705 can be raised or lowered to present features to affect the surface of the flexible surface layer 703 upon contact. Once the physical pattern of haptic substrate 705 is determined, the texture of flexible surface layer 703 can change to confirm its surface texture to the physical pattern of haptic substrate 705. It should be note that the deformation of flexible surface layer 703 from one texture to another can be controlled by deforming mechanism 711. For example, when deforming mechanism 711 is not activated, flexible surface layer 703 maintains its smooth configuration floating or sitting over haptic substrate 705. The surface configuration of flexible surface layer 703, however, deforms or changes from a smooth configuration to a coarse configuration when deforming mechanism 711 is activated and the haptic substrate 705 is in contact with the flexible surface layer 703 so as to generate a similar pattern on the top surface of the flexible surface layer 703.

Alternatively, flexible surface layer 703 is a flexible touch sensitive surface, which is capable of accepting user inputs. The flexible touch sensitive surface can be divided into multiple regions wherein each region of the flexible touch sensitive surface can accept an input when the region is being touched or depressed by a finger. In one embodiment, the flexible touch sensitive surface includes a sensor, which is capable of detecting a nearby finger and waking up or turning on the device. Flexible surface layer 703 may also include a flexible display, which is capable of deforming together with flexible surface layer 703. It should be noted that various flexible display technologies can be used to manufacture flexible displays, such as organic light-emitting diode ("OLED"), organic, or polymer Thin Film Transistor ("TFT").

Haptic substrate 705 is a surface reconfigurable haptic device capable of changing its surface pattern in response to one or more pattern activating signals. Haptic substrate 705 can also be referred to as a haptic mechanism, a haptic layer, a tactile element, and the like. Haptic substrate 705, in one embodiment, includes multiple tactile or haptic regions 707, 709, wherein each region can be independently controlled and activated. Since each tactile region can be independently activated, a unique surface pattern of haptic substrate 705 can be composed in response to the pattern activating signals. In another embodiment, every tactile region is further divided into multiple haptic bits wherein each bit can be independently excited or activated or deactivated.

Haptic substrate 705, or a haptic mechanism, in one embodiment, is operable to provide haptic feedback in response to an activating command or signal. Haptic substrate 705 provides multiple tactile or haptic feedbacks wherein one tactile feedback is used for surface deformation, while another tactile feedback is used for input confirmation. Input confirmation is a haptic feedback to inform a user about a selected input. Haptic mechanism 705, for example, can be implemented by various techniques including vibration, vertical displacement, lateral displacement, push/pull technique, air/fluid pockets, local deformation of materials, resonant mechanical elements, piezoelectric materials, micro-electro-mechanical systems ("MEMS") elements, thermal fluid pockets, MEMS pumps, variable porosity membranes, laminar flow modulation, or the like.

Haptic substrate 705, in one embodiment, is constructed by semi-flexible or semi-rigid materials. In one embodiment, haptic substrate should be more rigid than flexible surface 703 thereby the surface texture of flexible surface 703 can confirm to the surface pattern of haptic substrate 705. Haptic substrate 705, for example, includes one or more actuators, which can be constructed from fibers (or nanotubes) of electroactive polymers ("EAP"), piezoelectric elements, fiber of shape memory alloys ("SMAs") or the like. EAP, also known as biological muscles or artificial muscles, is capable of changing its shape in response to an application of voltage. The physical shape of an EAP may be deformed when it sustains large force. EAP may be constructed from Electrostrictive Polymers, Dielectric elastomers, Conducting Polymers, Ionic Polymer Metal Composites, Responsive Gels, Bucky gel actuators, or a combination of the above-mentioned EAP materials.

Shape Memory Alloy ("SMA"), also known as memory metal, is another type of material which can be used to construct haptic substrate 705. SMA may be made of copper-zinc-aluminum, copper-aluminum-nickel, nickel-titanium alloys, or a combination of copper-zinc-aluminum, copper-aluminum-nickel, and/or nickel-titanium alloys. A characteristic of SMA is that when its original shape is deformed, it regains its original shape in accordance with the ambient temperature and/or surrounding environment. It should be noted that the present embodiment may combine the EAP, piezoelectric elements, and/or SMA to achieve a specific haptic sensation.

Deforming mechanism 711 provides a pulling and/or pushing force to translate elements in the haptic substrate 705 causing flexible surface 703 to deform. For example, when deforming mechanism 711 creates a vacuum between flexible surface 703 and haptic substrate 705, flexible surface 703 is pushed against haptic substrate 705 causing flexible surface 703 to show the texture of flexible surface 703 in accordance with the surface pattern of haptic substrate 705. In other words, once a surface pattern of haptic substrate 705 is generated, flexible surface is pulled or pushed against haptic substrate 705 to reveal the pattern of haptic substrate 705 through the deformed surface of flexible surface 703. In one embodiment, haptic substrate 705 and deforming mechanism 711 are constructed in the same or substantially the same layer.

Upon receipt of a first activating signal, haptic substrate 705 generates a first surface pattern. After formation of the surface pattern of haptic substrate 705, deforming mechanism 711 is subsequently activated to change surface texture of flexible surface 703 in response to the surface pattern of haptic substrate 705. Alternatively, if haptic substrate 705 receives a second activating signal, it generates a second pattern.

Haptic substrate 705 further includes multiple tactile regions wherein each region can be independently activated to form a surface pattern of the substrate. Haptic substrate 705 is also capable of generating a confirmation feedback to confirm an input selection entered by a user. Deforming mechanism 711 is configured to deform the surface texture of flexible surface 703 from a first surface characteristic to a second surface characteristic. It should be noted that haptic device further includes a sensor, which is capable of activating the device when the sensor detects a touch on flexible surface 703. Deforming mechanism 711 may be a vacuum generator, which is capable of causing flexible surface 703 to collapse against the first surface pattern to transform its surface configuration in accordance with the configuration of first pattern of haptic substrate 705.

Haptic substrate 705 illustrates the state when tactile regions 707 and 709 are activated. Tactile regions 707 and 709 are raised in a z-axis direction. Upon receipt of one or more activating signals, haptic substrate 705 identifies a surface pattern in accordance with the activating signals. Haptic substrate 705 provides identified pattern by activating various tactile regions such as regions 707 and 709 to generate the pattern. It should be noted that tactile regions 707 and 709 imitate two buttons or keys. In another embodiment, tactile region 707 or 709 includes multiple haptic bits wherein each bit can be controlled for activating or deactivating.

Figure 8A:
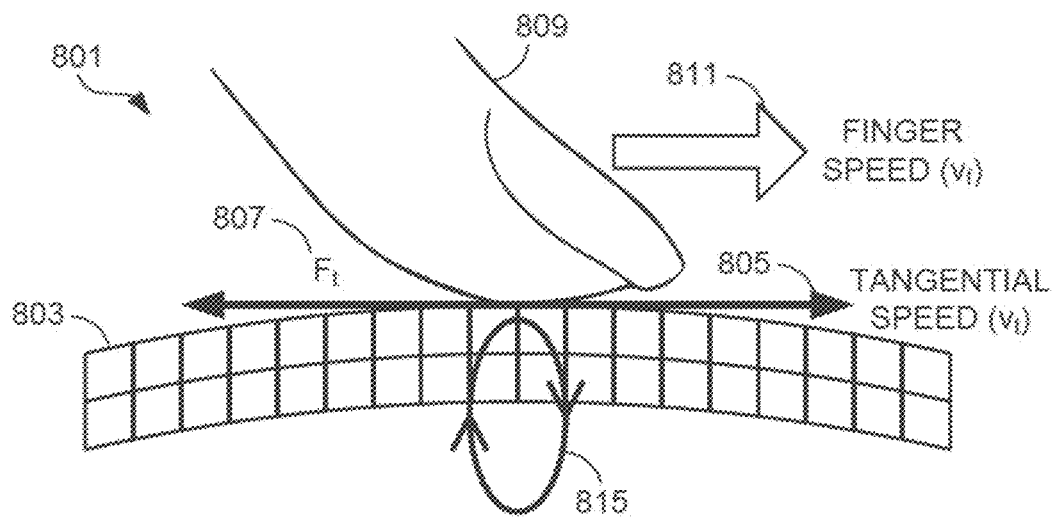
FIGS. 8A and 8B are views of a haptic device using ultrasonic surface friction ("USF") according to one embodiment of the invention.
Figure 8B:
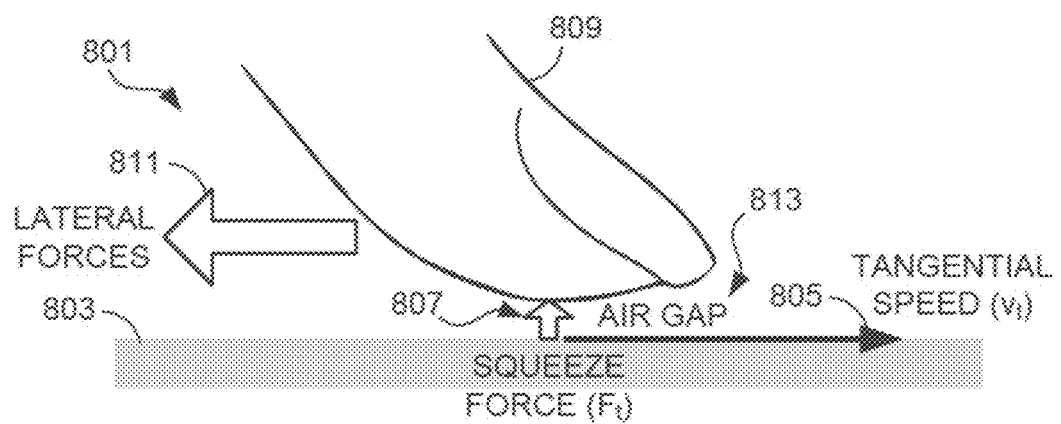

FIGS. 8A and 8B are views of a haptic device using USF. An ultrasonic vibration display 801 produces ultrasonic vibrations in the order of a few micrometers. The display 801 consists of a touch interface surface 803 that vibrates at the ultrasound range. The vibrations 805 travel along the touch surface 803 at a speed $v_t$ when a finger 809 is in contact and applies a force 807 $F_t$ to the surface 803. The vibrations 805 create an apparent reduction of friction on the surface 803. One explanation is that by moving up and down, the touch surface 803 creates an air gap 813 between the surface 803 and the interacting finger 809, and is the air gap 813 that causes the reduction in friction. This can be thought as of a Lamb wave 815 along the surface 803 that at some instants in time is in contact with the finger 809 when the finger 809 is in contact with the crest or peak of the wave 805, and sometimes is not when the finger 809 is above the valley of the wave 805. When finger 809 is moved in a lateral direction 811 at a speed $v_f$, the apparent friction of the surface 803 is reduced due to the on and off contact of the surface 803 with the finger 809. When the surface 803 is not activated, the finger 809 is always in contact with the surface 803 and the static or kinetic coefficients of friction remain constant.

Because the vibrations 805 occur on surface 803 in the ultrasound range of typically 20 KHz or greater, the wavelength content is usually smaller than the finger size, thus allowing for a consistent experience. It will be noted that the normal displacement of surface 803 is in the order of less than 5 micrometers, and that a smaller displacement results in lower friction reduction.

Figure 9:
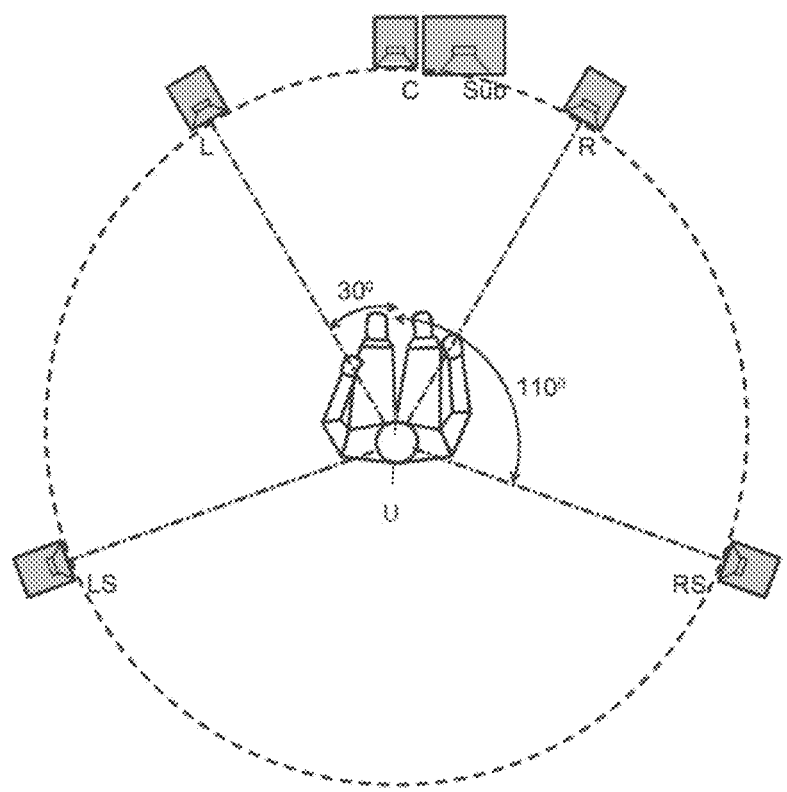
FIG. 9 is an example 5.1 multi-channel audio surround configuration according to one embodiment of the invention.

FIG. 9 is an example 5.1 multi-channel audio surround configuration according to one embodiment of the invention. The 5.1 multi-channel audio surround configuration includes a plurality of audio output devices, such as speakers. In the illustrated embodiment, the 5.1 multi-channel audio surround configuration (i.e., audio output devices C, Sub, L, R, LS, and RS) that are positioned within a circle that surrounds a user U. A source audio signal includes a plurality of source audio channels, where one or more source audio channels are mapped to an audio output device, where the audio output device output audio effects based on the mapped source audio channel(s). According to the embodiment, an LFE channel of the source audio signal can be mapped to audio output device Sub. As previously described, an LFE channel is an audio channel that has been encoded with an audio spectrum substantially less than the full spectrum of human auditory perception. An LFE track is typically used to encode low-frequency information with audible frequencies in the range of 20 Hz-120 Hz, but may include any other audio signal with a limited frequency range. The '0.1' of the 5.1 multi-channel audio surround configuration refers to the LFE channel, because the LFE channel typically only requires a fraction of the bandwidth of the other audio channels.

Figure 10:
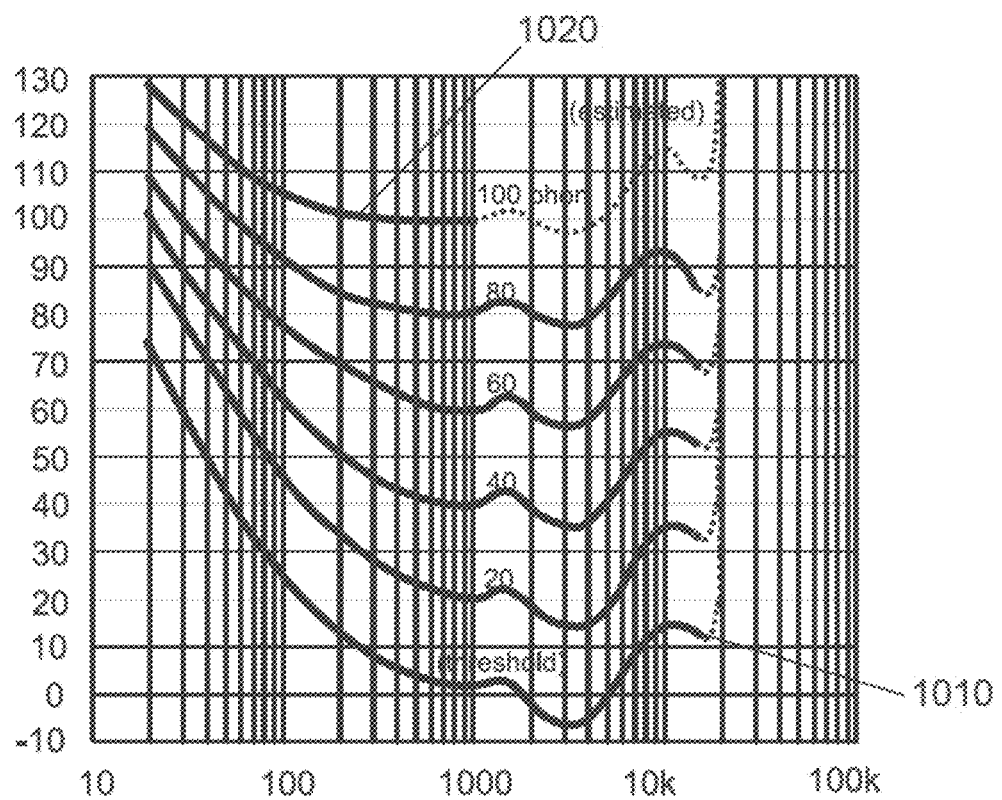
FIG. 10 is human auditory system equal-loudness chart according to one embodiment of the invention.

FIG. 10 is human auditory system equal-loudness chart according to one embodiment of the invention. An equal-loudness chart measures sound pressure ("dB SPL") over a frequency spectrum, for which a listener perceives a constant loudness when presented with pure steady tones. The unit of measurement for loudness levels is the "phon", and is arrived by reference to equal-loudness contours. A lowest equal-loudness contour 1010 represents a quietest audible tone and is also known as the absolute threshold of hearing. A highest equal-loudness contour 1020 is known as a threshold of pain.

FIGS. 11A and 11B are audio spectrograms showing a shifted, amplified and compressed audio signal according to one embodiment of the invention. More specifically, FIG. 11A shows an LFE audio signal 1110 that is extracted from a 5.1 audio signal. FIG. 11B shows an LFE audio signal 1120 that has been pitch-shifted, compressed, and amplified. By pitch-shifting an audio signal, one or more original frequencies of the audio signal are shifted to one or more new frequencies, where the new frequencies maintain the harmonic relationships of the original frequencies, so that a ratio of the new frequencies is the same as a ratio of the original frequencies. For example, an audio signal that includes a fundamental frequency of 1 KHz and two harmonic frequencies of 2 KHz and 5 KHz can be pitch-shifted upwards by a factor of 2.5, where the pitch-shifted audio signal includes a fundamental frequency of 2.5 KHz and two harmonic frequencies of 5 KHz and 12.5 KHz. In an alternate embodiment, LFE audio signal 1120 can be frequency-shifted, rather than pitch-shifted. By frequency-shifting an audio signal, one or more original frequencies of the audio signal are shifted to one or more new frequencies, where the new frequencies do not maintain the harmonic relationships of the original frequencies, so that a ratio of the new frequencies is not necessarily the same as a ratio of the original frequencies. For example, an audio signal that includes a fundamental frequency of 1 KHz and two harmonic frequencies of 2 KHz and 5 KHz can be frequency-shifted upwards by 1.5 KHz, where the frequency-shifted audio signal includes a fundamental frequency of 2.5 KHz and two harmonic frequencies of 3.55 KHz and 6.5 KHz. By either pitch-shifting, or frequency-shifting, LFE audio signal 1110 upwards, one or more frequencies of LFE audio signal 1110 can be shifted from an original frequency range to a target frequency range of a haptic output device, such as an actuator. Because the one or more frequencies of LFE audio signal 1120 are within a target frequency range of the haptic output device, LFE audio signal 1120 can be a suitable haptic signal for the haptic output device. In certain embodiments, the original frequency range can be a limited frequency range, such as 20 Hz-120 Hz. In these embodiments, one, some, or all of the one or more frequencies of LFE audio signal 1110 can be shifted outside of the limited frequency range. Further, in certain embodiments, the target frequency range of the haptic output device can be determined at run-time based on a type of the haptic output device. Examples of a target frequency range can include 30 Hz-120 Hz (e.g., for an LRA actuator), and 120 Hz-300 Hz (e.g., for a piezoelectric actuator).

Further, LFE audio signal 1120 can be compressed, amplified, or a combination of the two. Even further, LFE audio signal 1120 can be resampled to a target driving frequency of the haptic output device. More specifically, a rendering frequency of LFE audio signal 1120 can be shifted to a new rendering frequency, where the new rendering frequency can be equal to a target driving frequency of the haptic output device. This resampling can change how LFE audio signal 1120 is rendered (i.e., how many samples are played per second) to better fit the capability of the haptic output device. The resampling can be performed after LFE audio signal 1120 is pitch-shifted (or otherwise frequency-shifted), or the resampling can be performed at run-time, when LFE audio signal 1120 is sent to a haptic output device as a haptic signal. Further, in some embodiments, the resampling can be omitted. LFE audio signal 1120 can subsequently be sent to a haptic output device as a haptic signal, where the haptic output device can output one or more haptic effects based on the haptic signal.

Figure 12A:
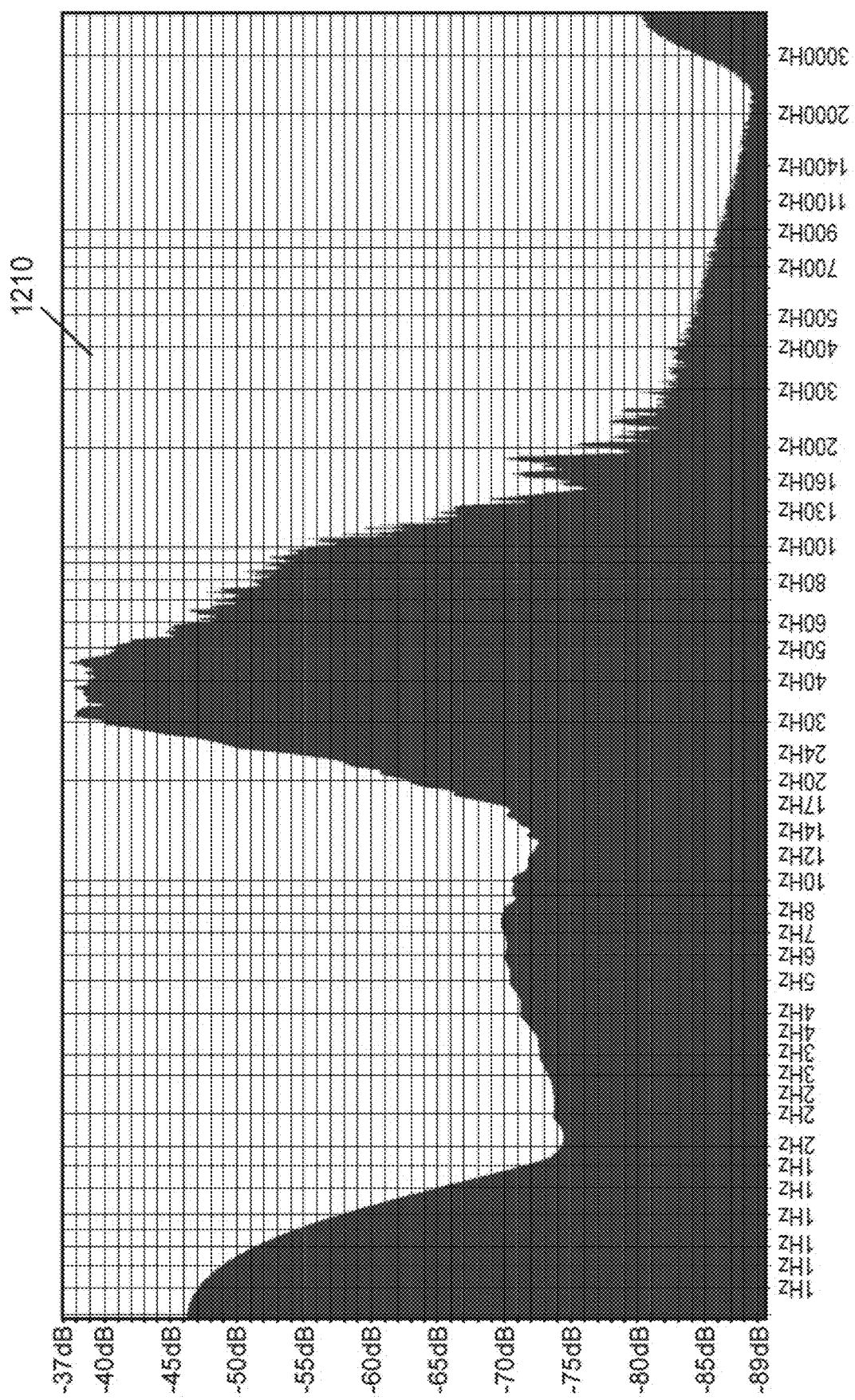
FIGS. 12A and 12B are Blackman-Harris windows showing a shifted audio signal according to one embodiment of the invention.
Figure 12B:
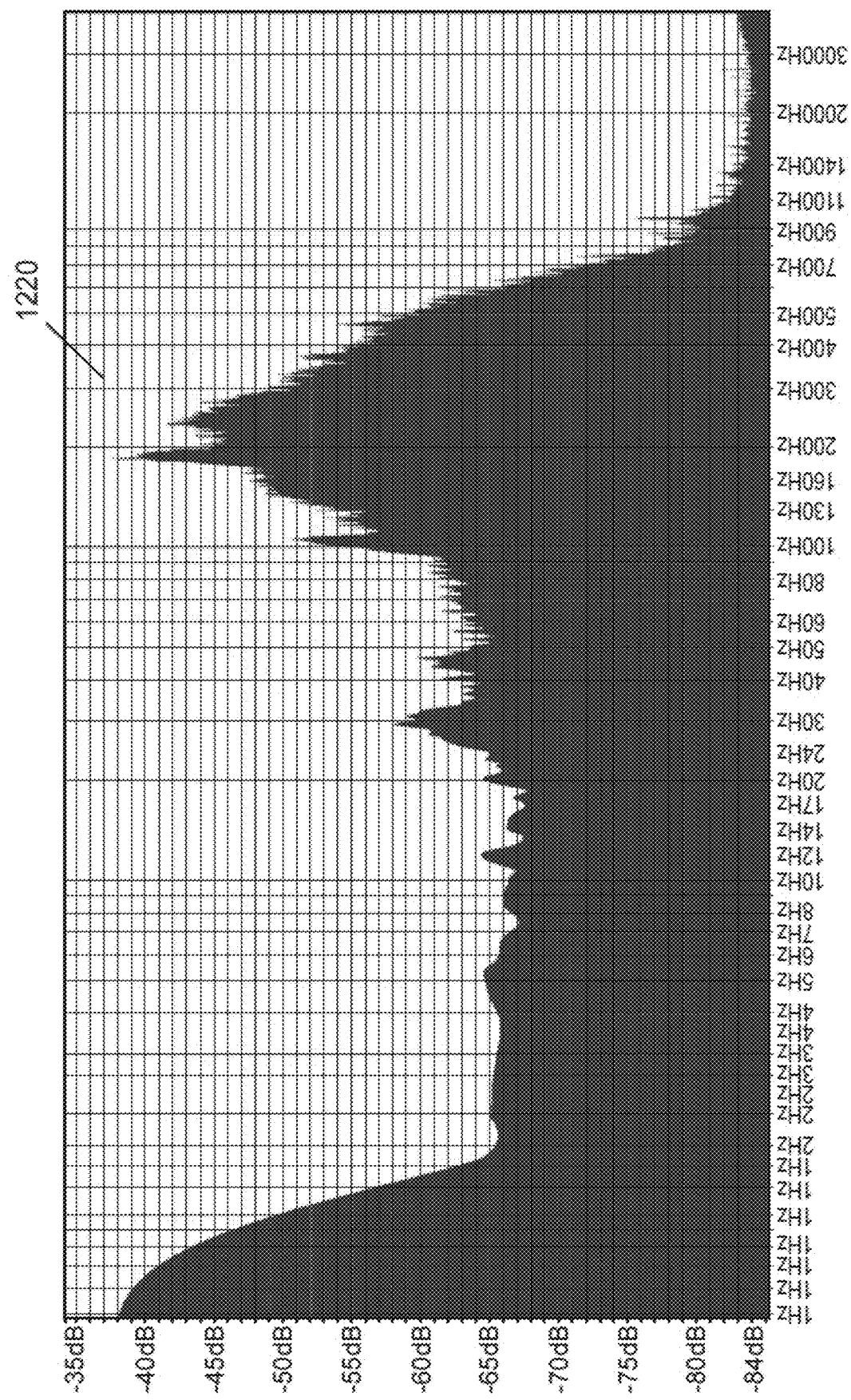

FIGS. 12A and 12B are Blackman-Harris windows showing a shifted audio signal according to one embodiment of the invention. More specifically, FIG. 12A shows an LFE audio signal 1210 that is extracted from a 5.1 audio signal. FIG. 12B shows an LFE audio signal 1220 that has been pitch-shifted. By pitch-shifting an audio signal, as previously described, one or more original frequencies of the audio signal are shifted to one or more new frequencies, where the new frequencies maintain the harmonic relationships of the original frequencies, so that a ratio of the new frequencies is the same as a ratio of the original frequencies. In an alternate embodiment, LFE audio signal 1220 can be frequency-shifted, rather than pitch-shifted. By frequency-shifting an audio signal, as previously described, one or more original frequencies of the audio signal are shifted to one or more new frequencies, where the new frequencies do not maintain the harmonic relationships of the original frequencies, so that a ratio of the new frequencies is not necessarily the same as a ratio of the original frequencies.

Figure 13:
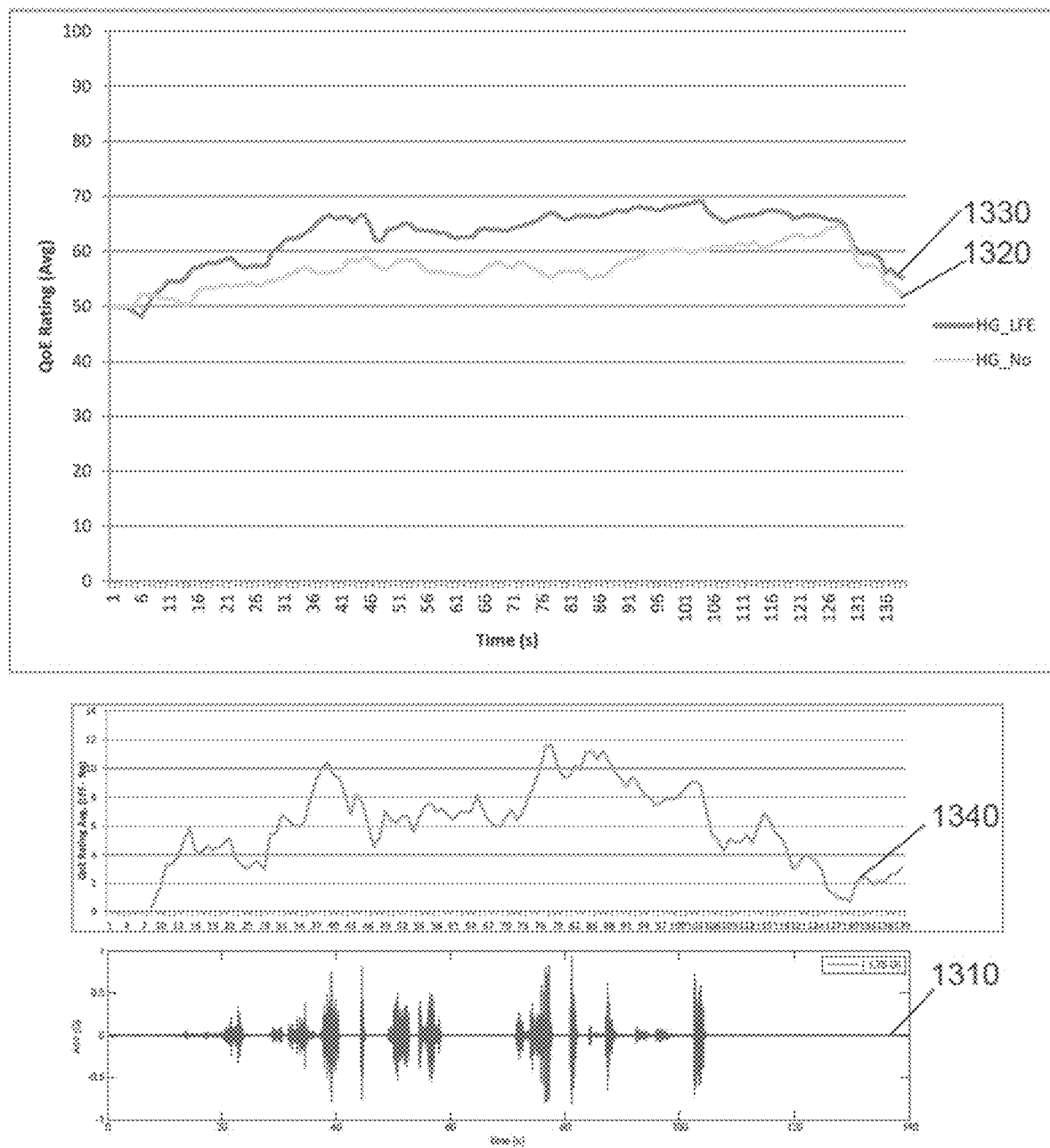
FIG. 13 is a quality of experience chart and corresponding low-frequency effects ("LFE") haptics chart according to one embodiment of the invention.

FIG. 13 is a quality of experience chart and LFE haptics chart according to one embodiment of the invention. According to the embodiment, a study was conducted with several participants, where test videos were shown to the participants, where the test videos were displayed on a tablet device. Some test videos included haptic effects that were generated based on extracting an LFE audio signal from an audio signal contained within each video and converting the LFE audio signal into a haptic signal. Other test videos did not include haptic effects. The participants wore high-quality stereo headphones as they watched the test videos, and held the tablet device in their hands. The participants watched the test videos and made real-time ratings with an experience time-lining interface. The participants further answered survey questions at the end of each test video. An actual presentation order of the test videos was varied to prevent repeated showings of the same video. The presentation order was counterbalanced between participants to control for order effects. A total video play time was approximately 32-35 minutes, and a total session time was equal to 90 minutes. Further, according to the embodiment, there were a total number of 20 participants, where the group of participants was gender-balanced. 50% of the participants indicated that they owned a tablet, and all of the participants indicated that they watch media on a smartphone or tablet regularly (i.e., 2-3 times a week).

According to the embodiment, a haptic signal 1310 is a haptic signal that is generated based on an LFE audio signal that is extracted from an audio signal included within a first video from the study. An LFE haptics version of the first video was shown to some of the participants of the study, where the LFE haptics version of the first video included haptic effects generated based on haptic signal 1310. A non-haptics version of the first video was shown to other participants of the study, where the non-haptics version of the first video did not include any haptic effects. Graph 1320 represents an average quality of experience ("QoE") rating indicated by the participants over a duration of the non-haptics version of the first video, where a QoE rating is a rating from 0 to 100 that indicates the quality of the viewing experience, where 0 represents a lowest quality, and where 100 represents a highest quality. Graph 1330 represents an average QoE rating indicated by the participants over a duration of the LFE haptics version of the first video. Further, graph 1340 represents a delta of the average QoE rating of graph 1330 and the average QoE rating of graph 1320 over a duration of the first video. As can be seen from graphs 1320, 1330, and 1340, the participants who experienced the LFE haptics version of the first video indicated a higher rating of quality than the participants who experienced the non-haptics version of the first video, especially during portions of the first video where the haptic effects were more pronounced based on the content of haptic signal 1310.

Figure 14A:
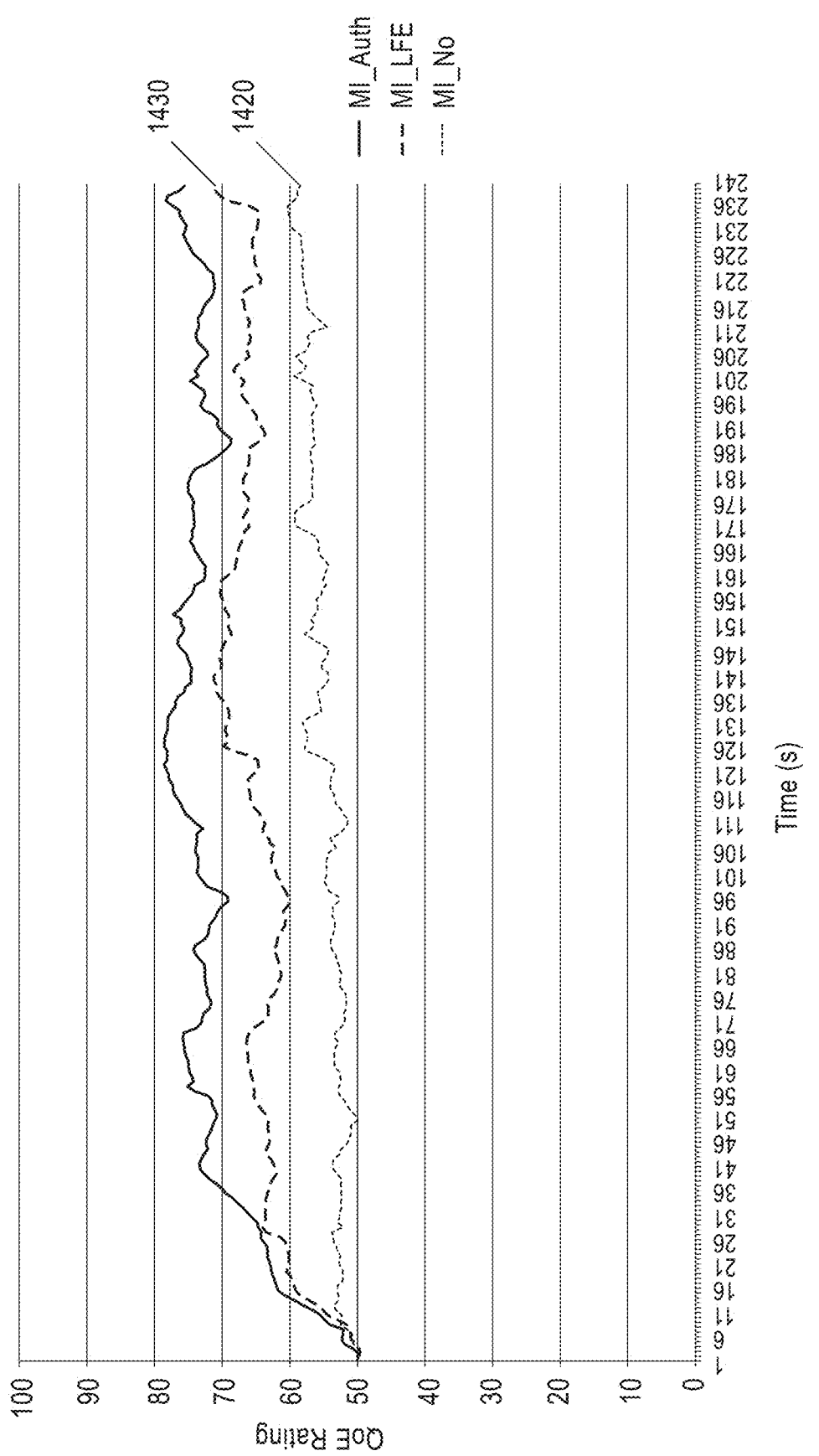
FIGS. 14A-14C are a quality of experience chart and corresponding LFE haptics chart according to one embodiment of the invention.
Figure 14B:
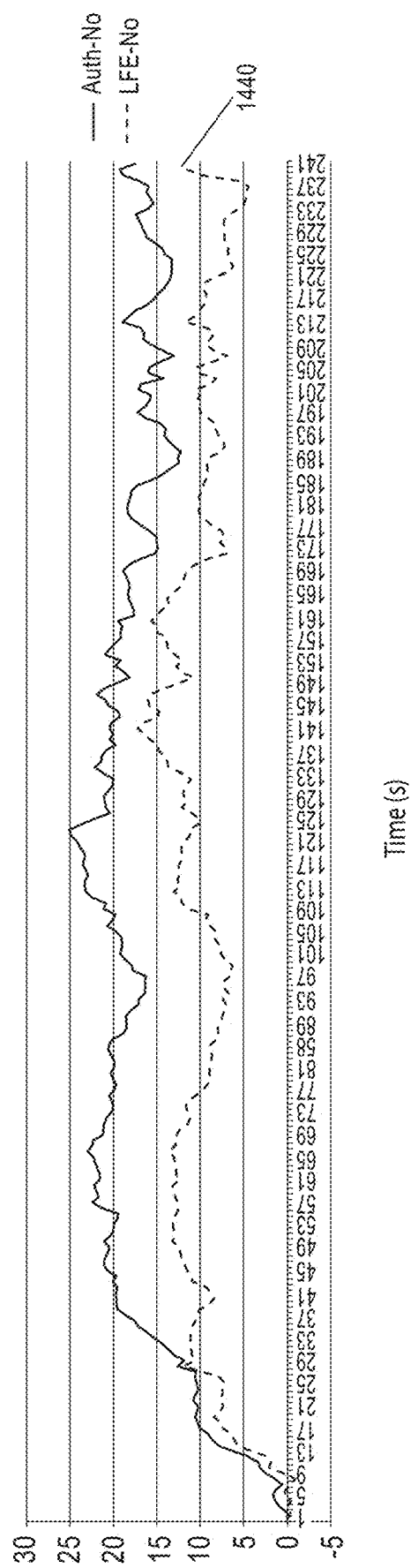
Figure 14C:
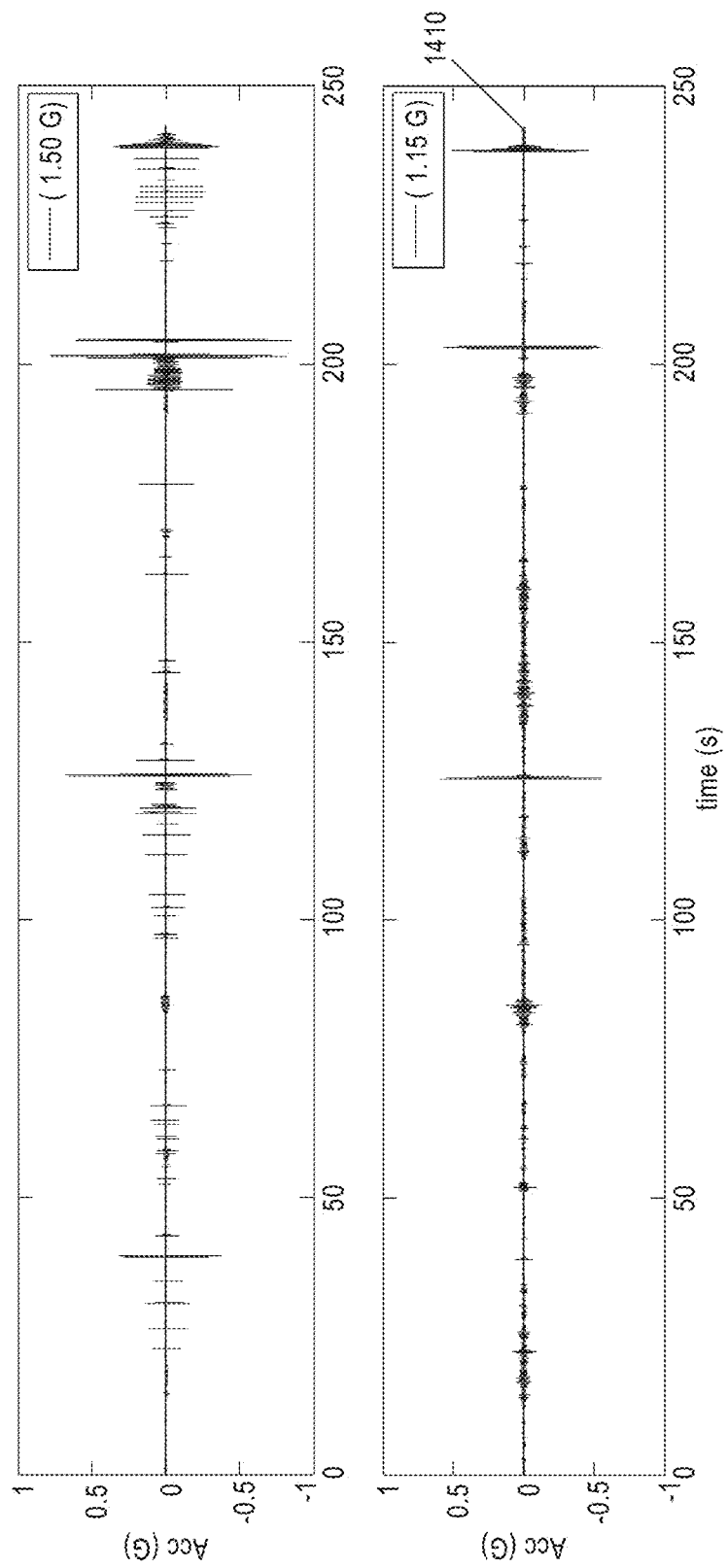

FIGS. 14A-14C are a quality of experience chart and LFE haptics chart according to one embodiment of the invention. A haptic signal 1410 is a haptic signal that is generated based on an LFE audio signal that is extracted from an audio signal included within a second video from the study. An LFE haptics version of the second video was shown to some of the participants of the study, where the LFE haptics version of the second video included haptic effects generated based on haptic signal 1410. A non-haptics version of the second video was shown to other participants of the study, where the non-haptics version of the second video did not include any haptic effects. Graph 1420 represents an average QoE rating indicated by the participants over a duration of the non-haptics version of the second video. Graph 1430 represents an average QoE rating indicated by the participants over a duration of the LFE haptics version of the second video. Further, graph 1440 represents a delta of the average QoE rating of graph 1430 and the average QoE rating of graph 1420 over a duration of the second video. As can be seen from graphs 1420, 1430, and 1440, the participants who experienced the LFE haptics version of the second video indicated a higher rating of quality than the participants who experienced the non-haptics version of the second video, especially during portions of the second video where the haptic effects were more pronounced based on the content of haptic signal 1410.

Figure 15A:
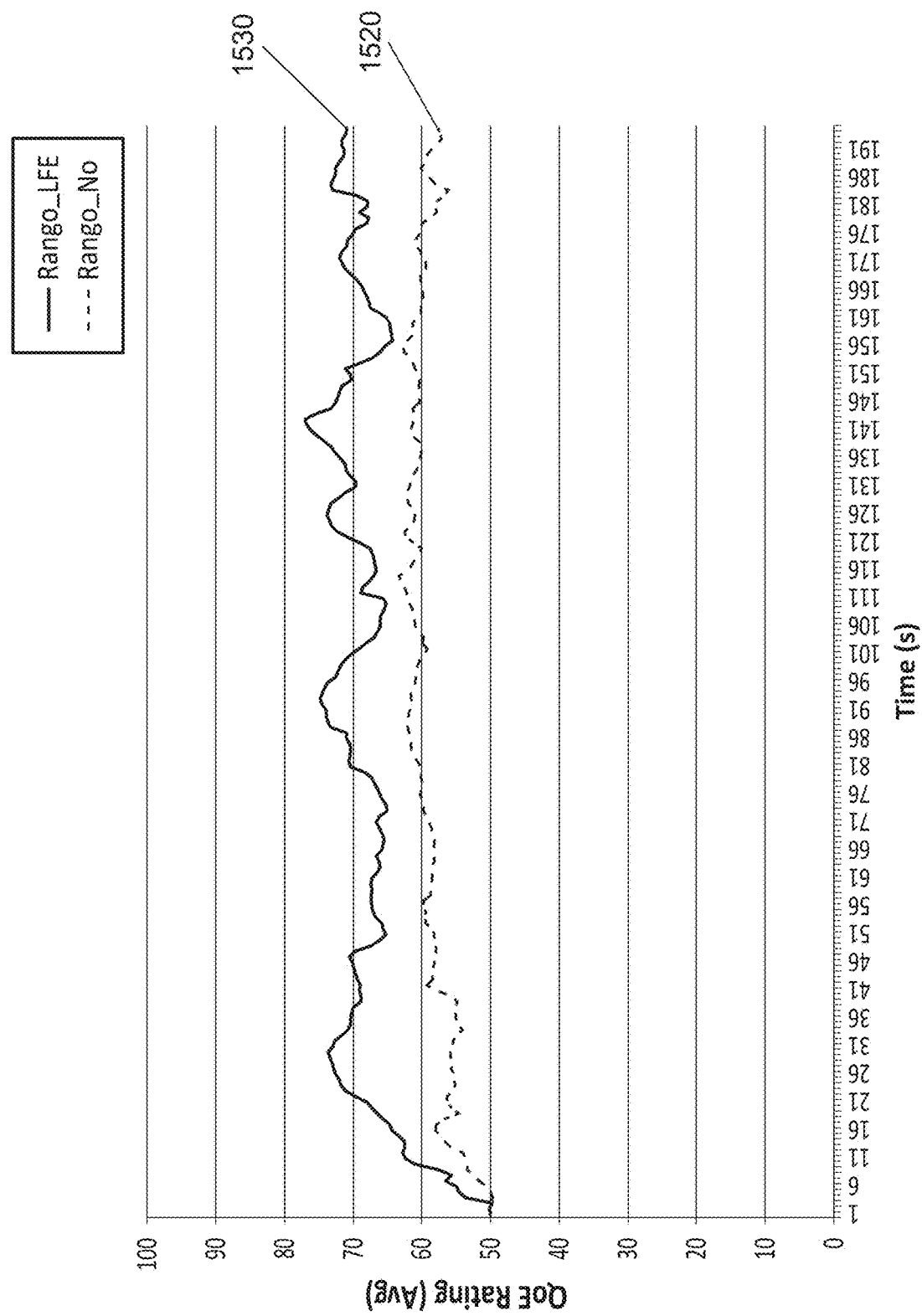
FIGS. 15A and 15B are a quality of experience chart and corresponding LFE haptics chart according to one embodiment of the invention.
Figure 15B:
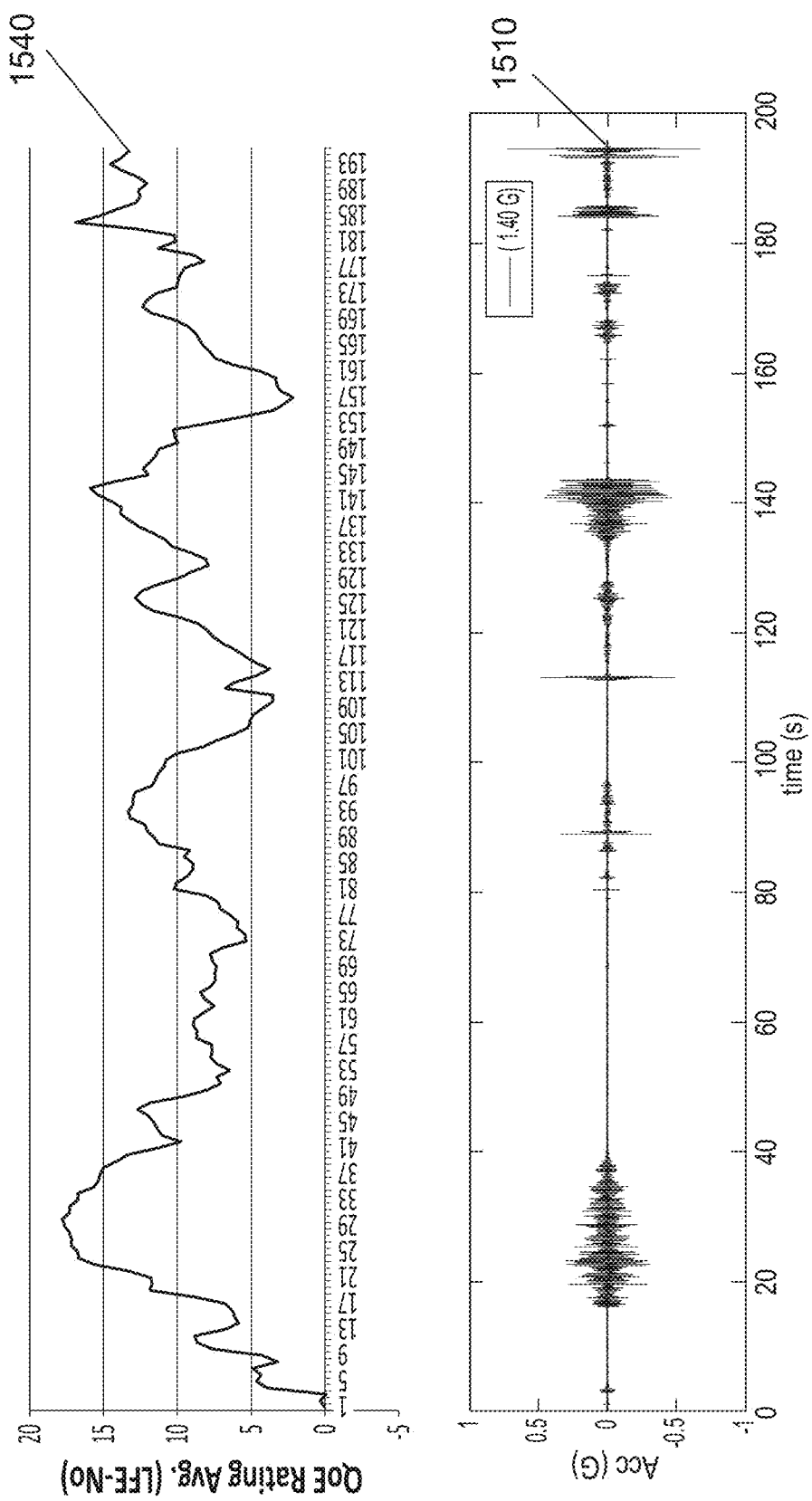

FIGS. 15A and 15B are a quality of experience chart and corresponding LFE haptics chart according to one embodiment of the invention. A haptic signal 1510 is a haptic signal that is generated based on an LFE audio signal that is extracted from an audio signal included within a third video from the study. An LFE haptics version of the third video was shown to some of the participants of the study, where the LFE haptics version of the third video included haptic effects generated based on haptic signal 1510. A non-haptics version of the third video was shown to other participants of the study, where the non-haptics version of the third video did not include any haptic effects. Graph 1520 represents an average QoE rating indicated by the participants over a duration of the non-haptics version of the third video. Graph 1530 represents an average QoE rating indicated by the participants over a duration of the LFE haptics version of the third video. Further, graph 1540 represents a delta of the average QoE rating of graph 1530 and the average QoE rating of graph 1520 over a duration of the third video. As can be seen from graphs 1520, 1530, and 1540, the participants who experienced the LFE haptics version of the third video indicated a higher rating of quality than the participants who experienced the non-haptics version of the third video, especially during portions of the third video where the haptic effects were more pronounced based on the content of haptic signal 1510.

Figure 16A:
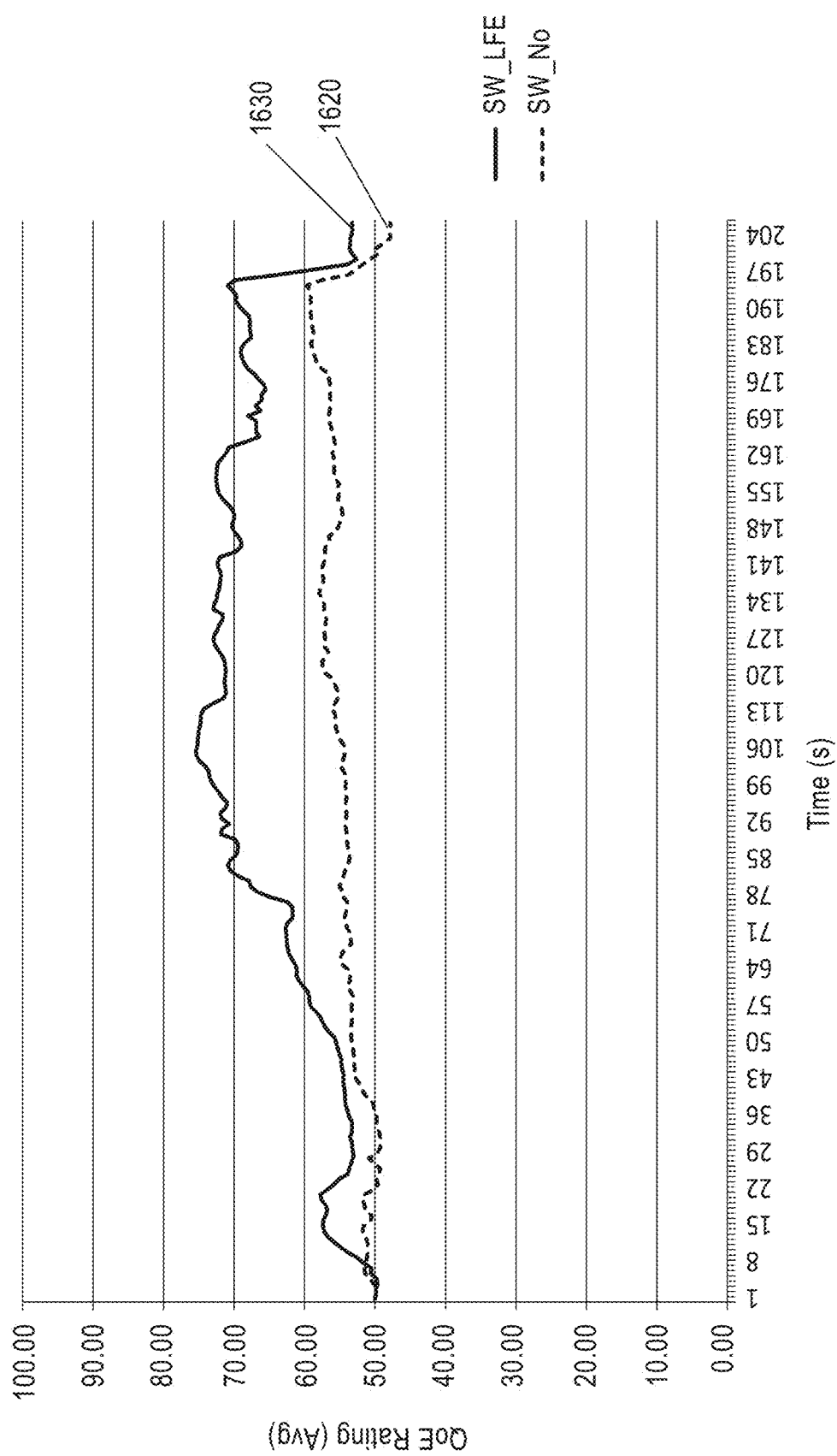
FIGS. 16A and 16B are a quality of experience chart and corresponding LFE haptics chart according to one embodiment of the invention.
Figure 16B:
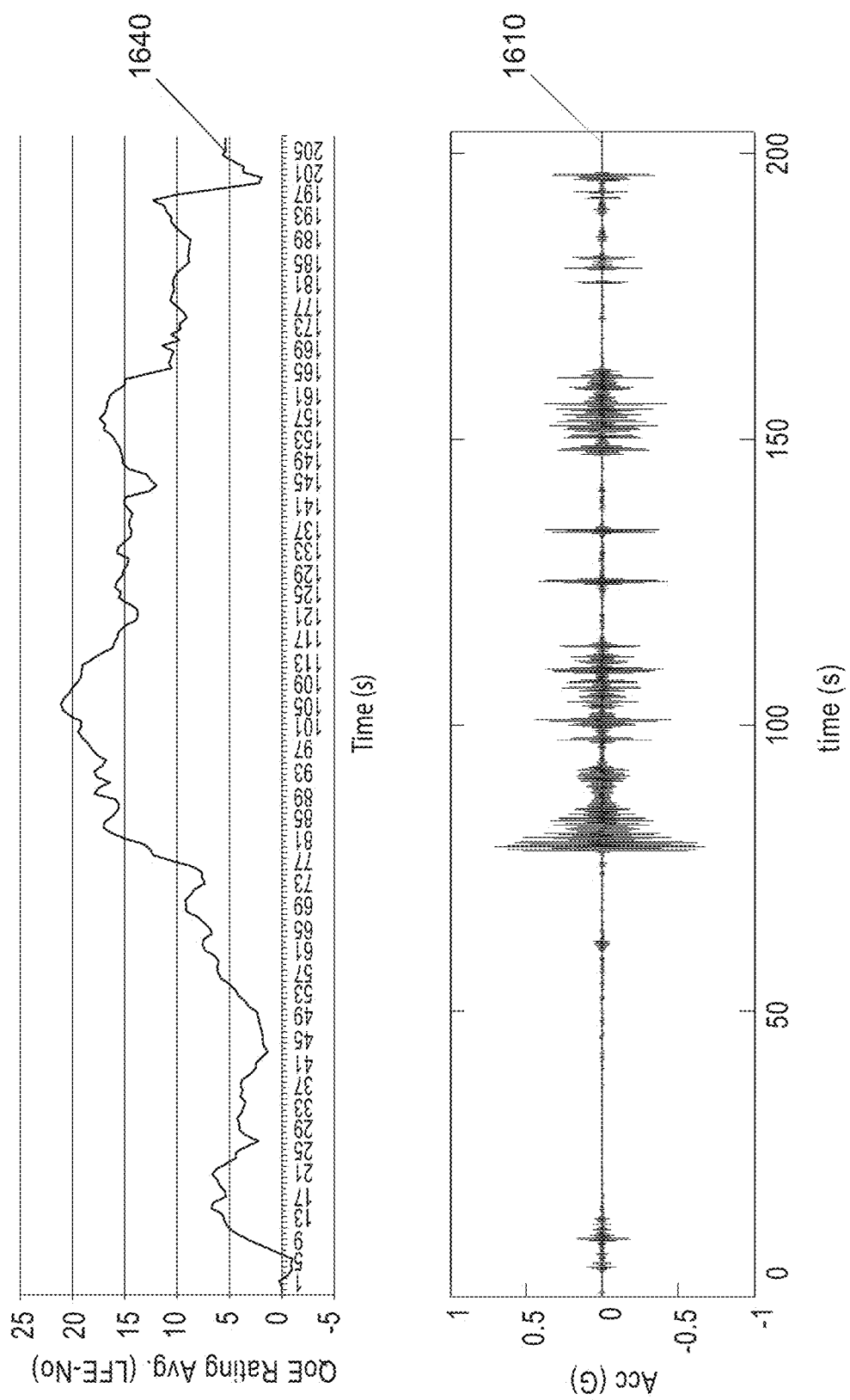

FIGS. 16A and 16B are a quality of experience chart and corresponding LFE haptics chart according to one embodiment of the invention. A haptic signal 1610 is a haptic signal that is generated based on an LFE audio signal that is extracted from an audio signal included within a fourth video from the study. An LFE haptics version of the fourth video was shown to some of the participants of the study, where the LFE haptics version of the fourth video included haptic effects generated based on haptic signal 1610. A non-haptics version of the fourth video was shown to other participants of the study, where the non-haptics version of the fourth video did not include any haptic effects. Graph 1620 represents an average QoE rating indicated by the participants over a duration of the non-haptics version of the fourth video. Graph 1630 represents an average QoE rating indicated by the participants over a duration of the LFE haptics version of the fourth video. Further, graph 1640 represents a delta of the average QoE rating of graph 1630 and the average QoE rating of graph 1620 over a duration of the fourth video. As can be seen from graphs 1620, 1630, and 1640, the participants who experienced the LFE haptics version of the fourth video indicated a higher rating of quality than the participants who experienced the non-haptics version of the fourth video, especially during portions of the fourth video where the haptic effects were more pronounced based on the content of haptic signal 1610.

Figure 17A:
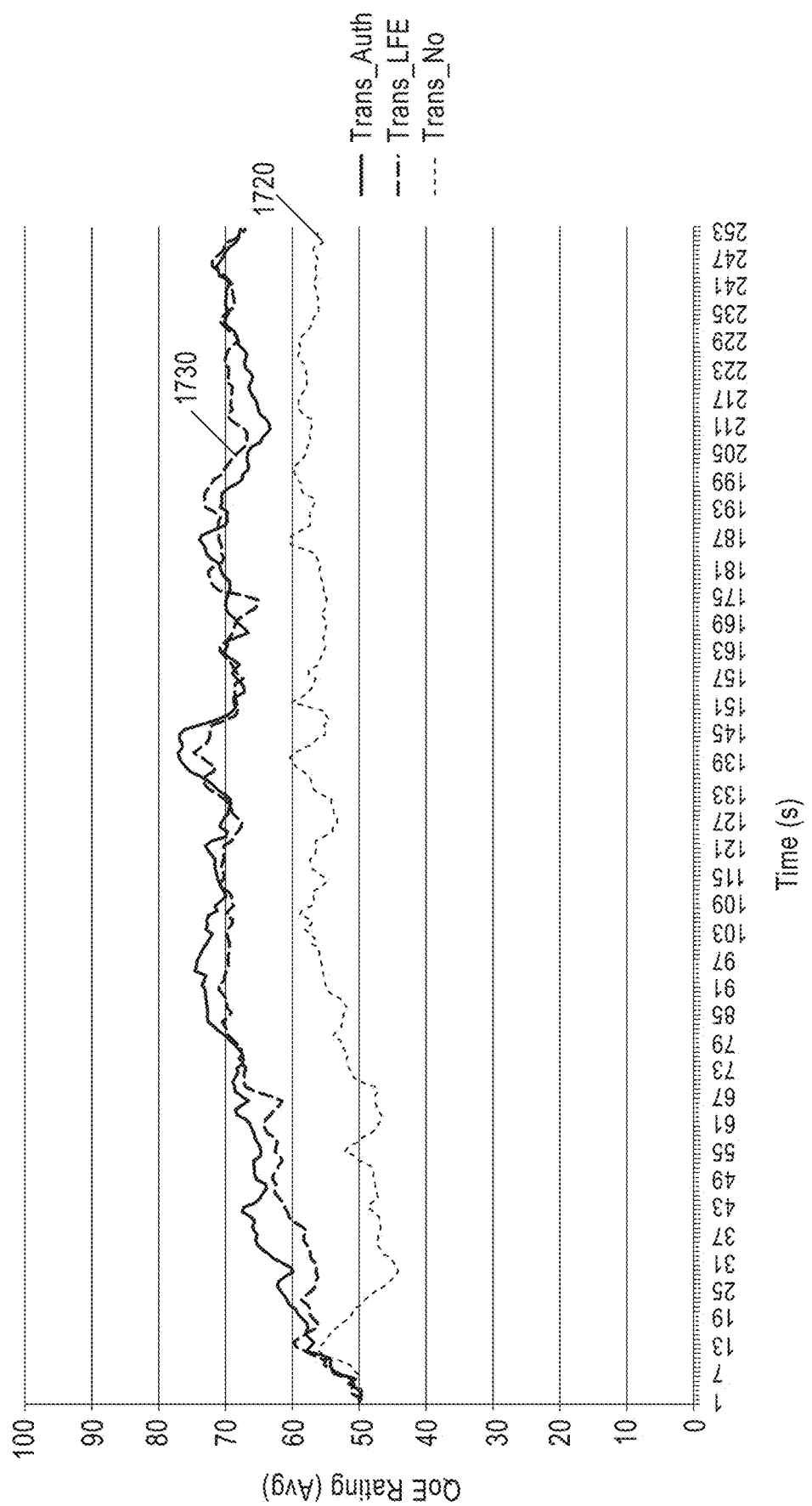
FIGS. 17A-17C is a quality of experience chart and corresponding LFE haptics chart according to one embodiment of the invention.
Figure 17B:
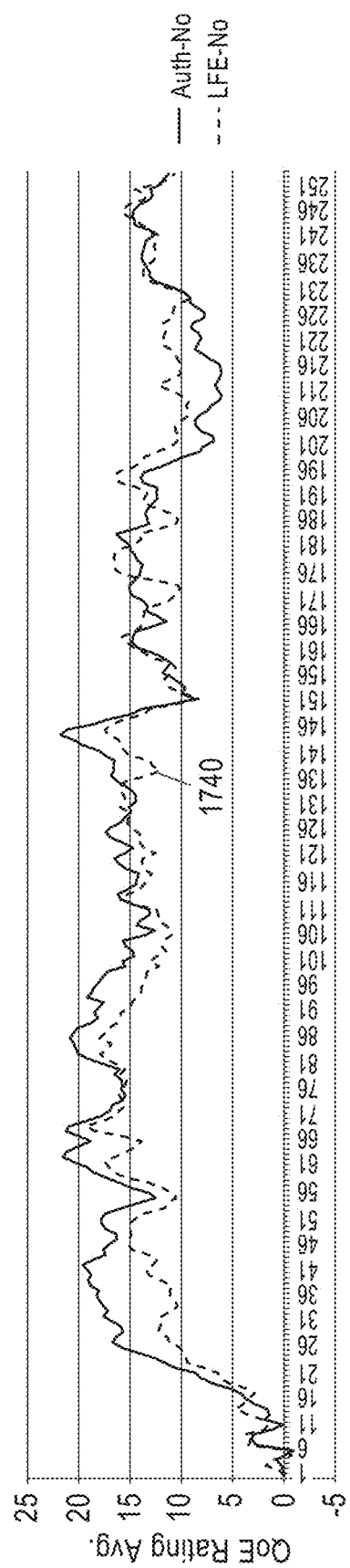
Figure 17C:
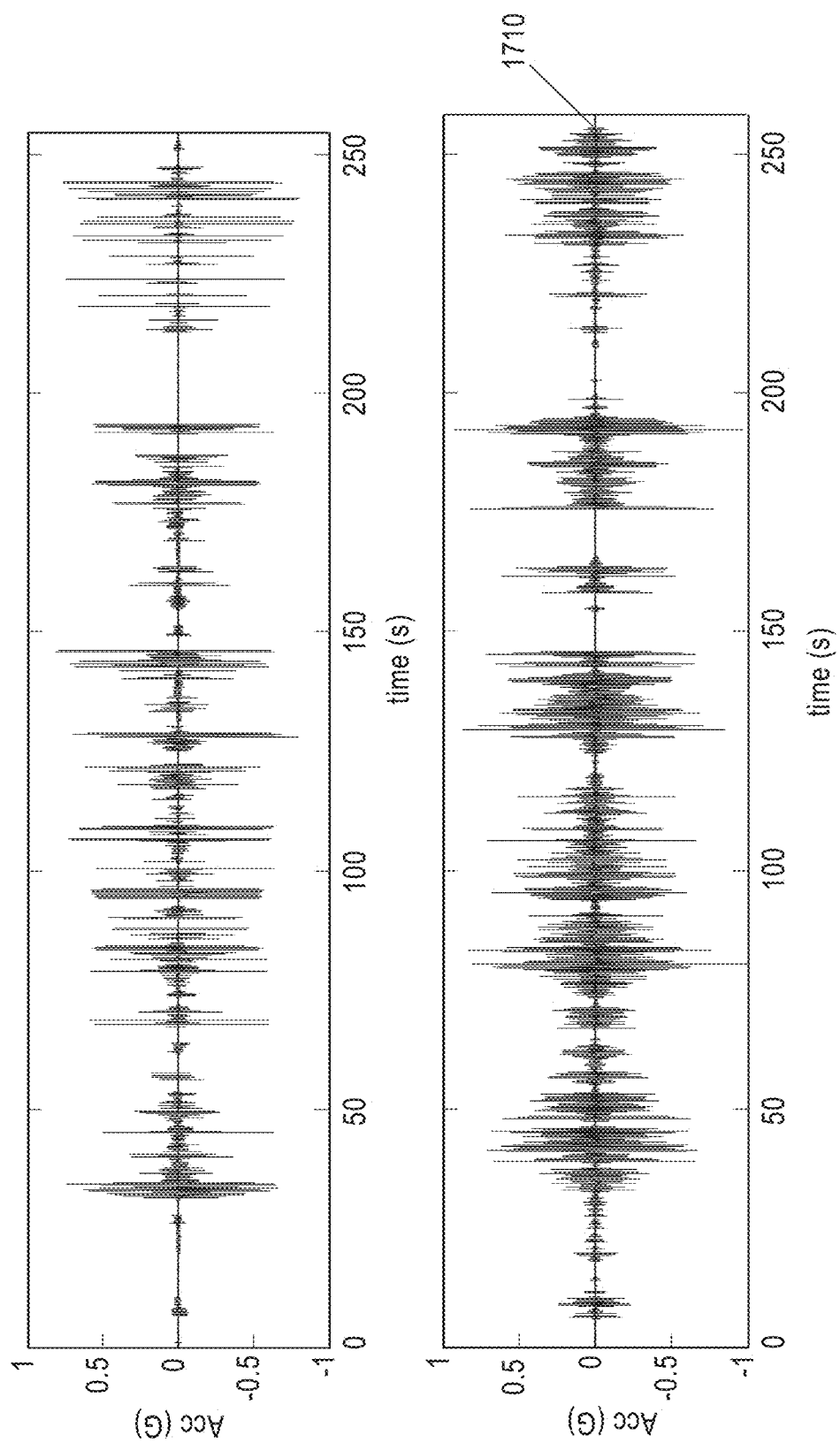

FIGS. 17A-17C are a quality of experience chart and corresponding LFE haptics chart according to one embodiment of the invention. A haptic signal 1710 is a haptic signal that is generated based on an LFE audio signal that is extracted from an audio signal included within a fifth video from the study. An LFE haptics version of the fifth video was shown to some of the participants of the study, where the LFE haptics version of the fifth video included haptic effects generated based on haptic signal 1710. A non-haptics version of the fifth video was shown to other participants of the study, where the non-haptics version of the fifth video did not include any haptic effects. Graph 1720 represents an average QoE rating indicated by the participants over a duration of the non-haptics version of the fifth video. Graph 1730 represents an average QoE rating indicated by the participants over a duration of the LFE haptics version of the fifth video. Further, graph 1740 represents a delta of the average QoE rating of graph 1730 and the average QoE rating of graph 1720 over a duration of the fifth video. As can be seen from graphs 1720, 1730, and 1740, the participants who experienced the LFE haptics version of the fifth video indicated a higher rating of quality than the participants who experienced the non-haptics version of the fifth video, especially during portions of the fifth video where the haptic effects were more pronounced based on the content of haptic signal 1710.

Figure 18:
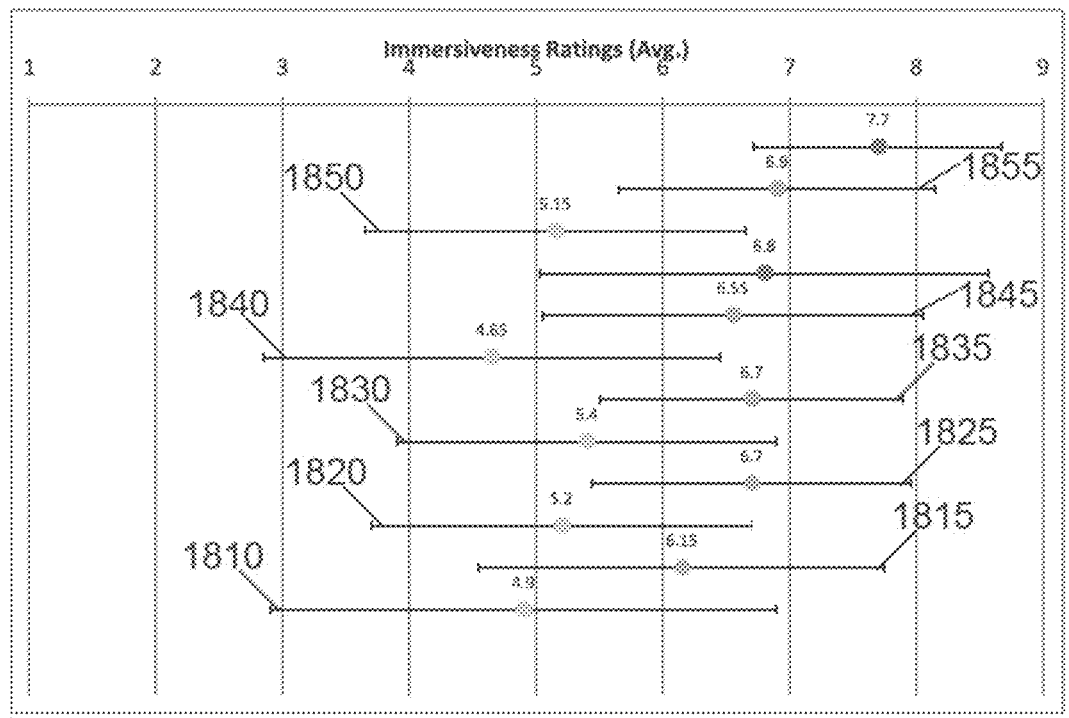
FIG. 18 is an immersiveness summary chart according to one embodiment of the invention.

FIG. 18 is an immersiveness summary chart according to one embodiment of the invention. The immersiveness summary chart compares immersive ratings indicated by participants of the study for the LFE haptics versions of the videos with immersive ratings indicated by participants of the study for the non-haptics versions of the videos, where an immersive rating is a rating from 0 to 9 that indicates how immersed into the viewing experience the participant was, where 0 represents a lowest amount of immersiveness, and where 9 represents a highest amount of immersiveness.

The immersiveness summary chart of FIG. 18 includes immersiveness rating sets 1810, 1815, 1820, 1825, 1830, 1835, 1840, 1845, 1850, and 1855. Immersiveness rating set 1810 represents immersiveness ratings for a non-haptics version of a first video of the study. Immersiveness rating set 1815 represents immersiveness ratings for an LFE haptics version of the first video. An average rating of immersiveness rating set 1815 (i.e., 6.15) is higher than an average rating of immersiveness rating set 1810 (i.e., 4.9). Further, immersiveness rating set 1820 represents immersiveness ratings for a non-haptics version of a second video of the study. Immersiveness rating set 1825 represents immersiveness ratings for an LFE haptics version of the second video. An average rating of immersiveness rating set 1825 (i.e., 6.7) is higher than an average rating of immersiveness rating set 1820 (i.e., 5.2). Immersiveness rating set 1830 represents immersiveness ratings for a non-haptics version of a third video of the study. Immersiveness rating set 1835 represents immersiveness ratings for an LFE haptics version of the third video. An average rating of immersiveness rating set 1835 (i.e., 6.7) is higher than an average rating of immersiveness rating set 1830 (i.e., 5.4).

Further, immersiveness rating set 1840 represents immersiveness ratings for a non-haptics version of a fourth video of the study. Immersiveness rating set 1845 represents immersiveness ratings for an LFE haptics version of the fourth video. An average rating of immersiveness rating set 1845 (i.e., 6.55) is higher than an average rating of immersiveness rating set 1840 (i.e., 4.65). Immersiveness rating set 1850 represents immersiveness ratings for a non-haptics version of a fifth video of the study. Immersiveness rating set 1855 represents immersiveness ratings for an LFE haptics version of the fifth video. An average rating of immersiveness rating set 1855 (i.e., 6.9) is higher than an average rating of immersiveness rating set 1850 (i.e., 5.15). Thus, all differences between the immersiveness ratings for the LFE haptics versions of the videos and the immersive ratings for the non-haptics versions of the videos are statistically significant. Further, on average, the LFE haptics versions of the videos were rated 30% more immersive by the participants of the study, as compared with the non-haptics versions of the videos.

Figure 19:
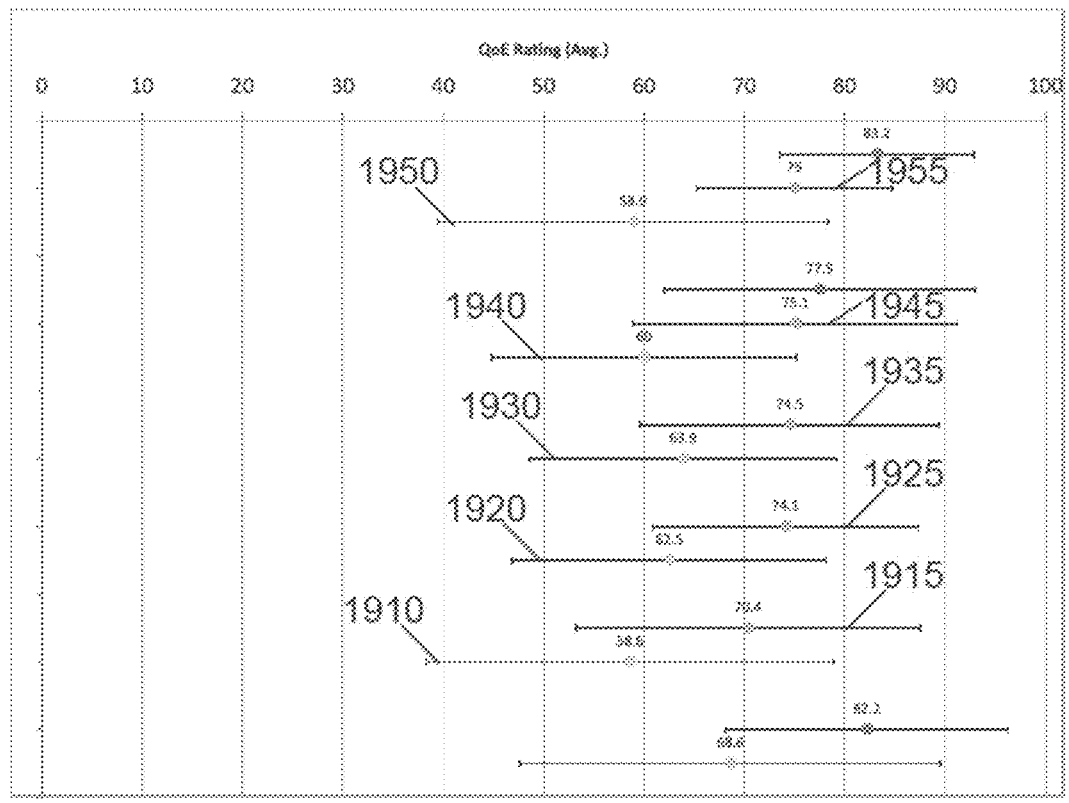
FIG. 19 is a quality of experience summary chart according to one embodiment of the invention.

FIG. 19 is a quality of experience summary chart according to one embodiment of the invention. The quality of experience summary chart compares QoE ratings indicated by participants of the study for the LFE haptics versions of the videos with QoE ratings indicated by participants of the study for the non-haptics versions of the videos, where a QoE rating is a rating from 0 to 100 that indicates the quality of the viewing experience, where 0 represents a lowest quality, and where 100 represents a highest quality.

The quality of experience summary chart of FIG. 19 includes QoE rating sets 1910, 1915, 1920, 1925, 1930, 1935, 1940, 1945, 1950, and 1955. QoE rating set 1910 represents QoE ratings for a non-haptics version of a first video of the study. QoE rating set 1915 represents QoE ratings for an LFE haptics version of the first video. An average rating of QoE rating set 1915 (i.e., 70.4) is higher than an average rating of QoE rating set 1910 (i.e., 58.6). Further, QoE rating set 1920 represents QoE ratings for a non-haptics version of a second video of the study. QoE rating set 1925 represents QoE ratings for an LFE haptics version of the second video. An average rating of QoE rating set 1925 (i.e., 74.1) is higher than an average rating of QoE rating set 1920 (i.e., 62.5). QoE rating set 1930 represents QoE ratings for a non-haptics version of a third video of the study. QoE rating set 1935 represents QoE ratings for an LFE haptics version of the third video. An average rating of QoE rating set 1935 (i.e., 74.5) is higher than an average rating of QoE rating set 1930 (i.e., 63.9).

Further, QoE rating set 1940 represents QoE ratings for a non-haptics version of a fourth video of the study. QoE rating set 1945 represents QoE ratings for an LFE haptics version of the fourth video. An average rating of QoE rating set 1945 (i.e., 75.1) is higher than an average rating of QoE rating set 1940 (i.e., 60). QoE rating set 1950 represents QoE ratings for a non-haptics version of a fifth video of the study. QoE rating set 1955 represents QoE ratings for an LFE haptics version of the fifth video. An average rating of QoE rating set 1955 (i.e., 75) is higher than an average rating of QoE rating set 1950 (i.e., 58.9). Thus, all differences between the QoE ratings for the LFE haptics versions of the videos and the QoE ratings for the non-haptics versions of the videos are statistically significant. Further, on average, the LFE haptics versions of the videos were rated 21% higher by the participants of the study, as compared with the non-haptics versions of the videos.

Figure 20:
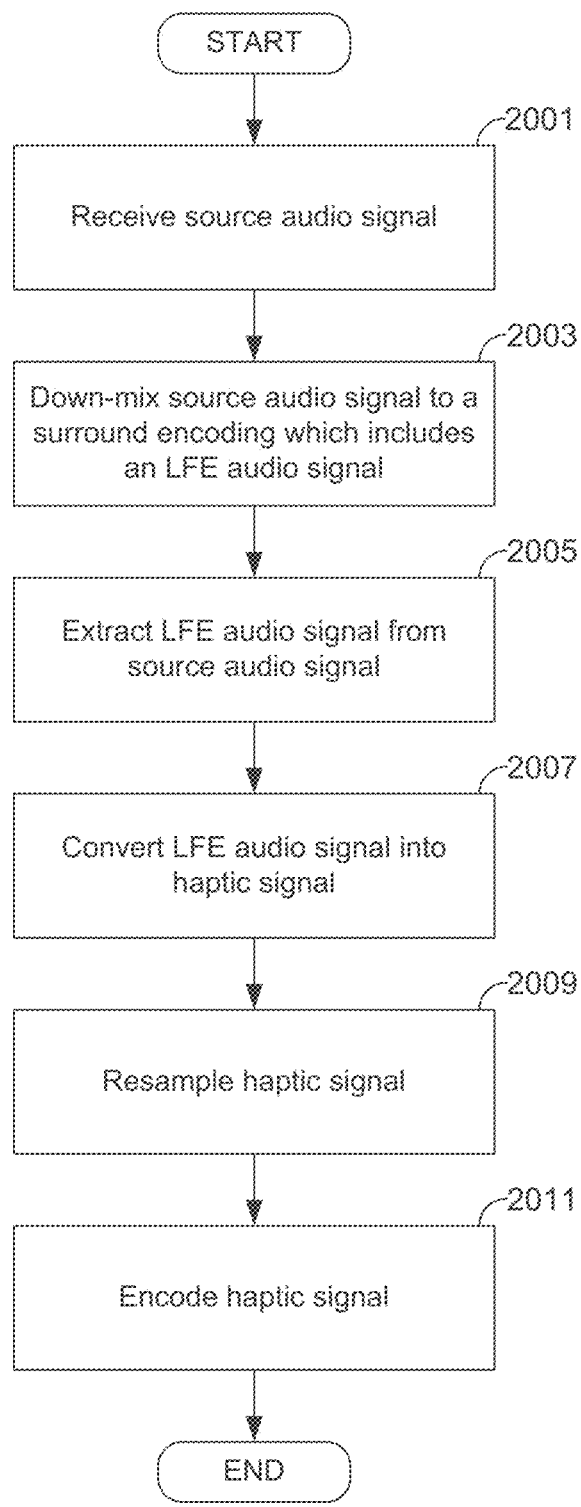
FIG. 20 is a flow diagram for converting an LFE audio signal into a haptic signal according to an embodiment of the invention.

FIG. 20 is a flow diagram for converting an LFE audio signal into a haptic signal according to an embodiment of the invention. In one embodiment, the functionality of the flow diagram of FIG. 20, as well as the functionality of the flow diagrams of FIGS. 21, 22, 23, 24, 25, 28, 29, and 30 are each implemented by software stored in memory or other computer readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some functionality may be omitted.

The flow begins and proceeds to 2001. At 2001, a source audio signal is received. The source audio signal includes multiple audio signals, where the audio signals can be contained within multiple tracks or channels. At least one of the multiple audio signals can be an LFE audio signal, where the LFE audio signal is contained within an LFE track or LFE channel. The flow then proceeds to 2003.

At 2003, the source audio signal is down-mixed to a surround encoding which includes the LFE audio signal. In certain embodiments, the surround encoding can be a 5.1 surround encoding. The flow then proceeds to 2005.

At 2005, the LFE audio signal is extracted from the source audio signal. In certain embodiments where the LFE audio signal is encoded within the source audio signal, the extracted LFE audio signal is also decoded. The flow then proceeds to 2007.

At 2007, the LFE audio signal is converted into a haptic signal. In certain embodiments, the LFE audio signal can be converted into the haptic signal by pitch-shifting the LFE audio signal. By pitch-shifting the LFE audio signal, an original pitch of the LFE audio signal can be shifted to a target pitch within a target pitch range of a haptic output device, such as an actuator. Further, by shifting the original pitch of the LFE audio signal to the target pitch, one or more original frequencies of the LFE audio signal can be shifted to one or more target frequencies, where a ratio of the one or more target frequencies is the same as a ratio of the one or more original frequencies. In certain embodiments, the original pitch of the LFE audio signal can be within a limited pitch range, such as 20 Hz-100 Hz. In some embodiments, the shift of the original pitch of the LFE audio signal is a shift of the original pitch outside of the limited pitch range. In some of these embodiments, the shift of the original pitch of the LFE audio signal is a shift of the original pitch completely outside of the limited pitch range. In other embodiments, the LFE audio signal can be converted into the haptic signal by frequency-shifting the LFE audio signal. By frequency-shifting the LFE audio signal, one or more original frequencies of the LFE audio signal can be shifted to one or more target frequencies within a target frequency range, where a ratio of the one or more target frequencies is not the same as a ratio of the one or more original frequencies. In certain embodiments, the one or more original frequencies of the LFE audio signal can be within a limited frequency range, such as 20 Hz-100 Hz. In some embodiments, the shift of the one or more original frequencies of the LFE audio signal is a shift of the one or more original frequencies outside of the limited frequency range. In some of these embodiments, the shift of the one or more original frequencies of the LFE audio signal is a shift of the one or more original frequencies completely outside of the limited frequency range. The flow then proceeds to 2009.

At 2009, the haptic signal is resampled to a target driving frequency of the haptic output device. An example target driving frequency is 8 KHz. The flow then proceeds to 2011.

At 2011, the haptic signal is encoded in a container, or streaming data format, of a file which supports haptic data encoding. In certain embodiments, the haptic signal is encoded within the LFE audio signal. The haptic signal can subsequently be extracted from the container, decoded, and sent to the haptic output device, where the haptic signal causes the haptic output device to output one or more haptic effects. The flow then ends.

In certain embodiments, one or more parameters may be provided (either automatically or by a user) to adjust the pitch-shift, or frequency-shift, to control an amount or locality of the pitch-shift, or frequency-shift. Further, in some embodiments, additional processing of the LFE audio signal can be performed before or after the pitch-shift, or frequency-shift. The additional processing can include filtering, or other "smoothing" operations, to remove noise introduced by the pitch-shift, of frequency-shift. Further, in some embodiments, the haptic signal can be sent to the haptic output device in real-time or near real-time. Even further, in some embodiments, the one or more parameters may be provided by the user using an authoring tool, such as a digital audio authoring software application.

Figure 21:
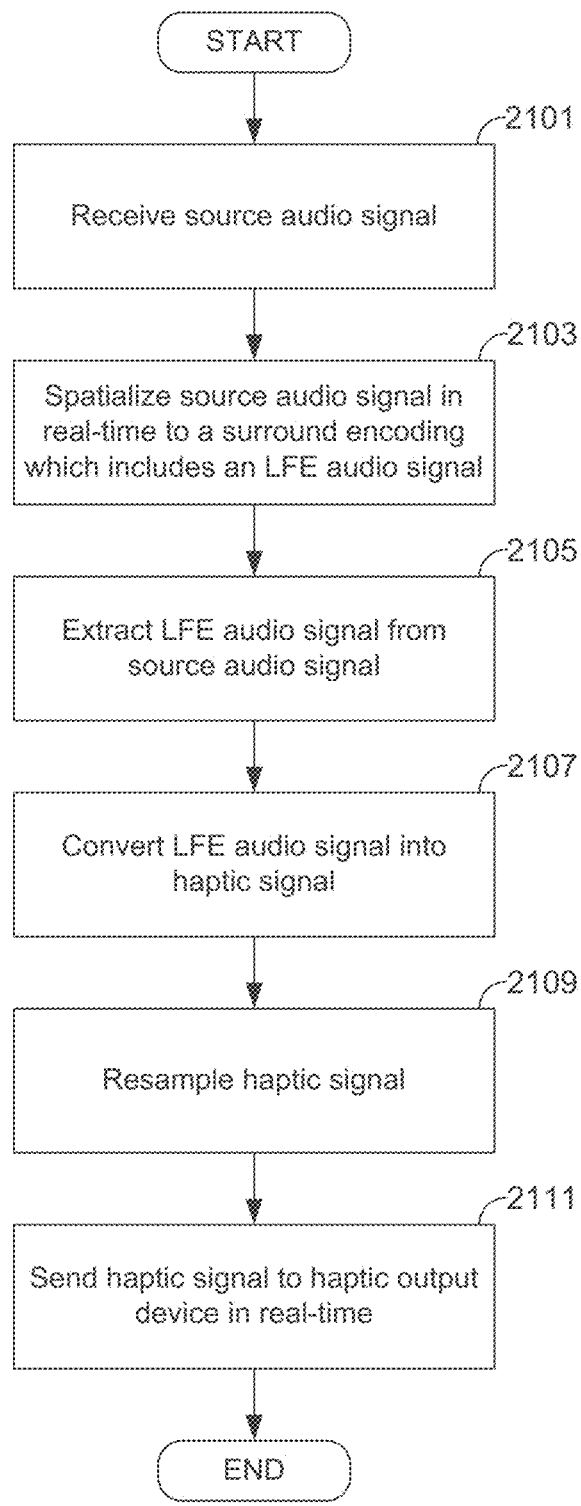
FIG. 21 is a flow diagram for converting an LFE audio signal into a haptic signal according to another embodiment of the invention.

FIG. 21 is a flow diagram for converting an LFE audio signal into a haptic signal according to another embodiment of the invention. The flow begins and proceeds to 2101. At 2101, a source audio signal is received. The source audio signal includes multiple audio signals, where the audio signals can be contained within multiple tracks or channels. At least one of the multiple audio signals can be an LFE audio signal, where the LFE audio signal is contained within an LFE track or LFE channel. The flow then proceeds to 2103.

At 2103, the source audio signal is spatialized in real-time to a surround encoding which includes the LFE audio signal. In certain embodiments, the surround encoding can be a 5.1 surround encoding. The flow then proceeds to 2105.

At 2105, the LFE audio signal is extracted from the source audio signal. In certain embodiments where the LFE audio signal is encoded within the source audio signal, the extracted LFE audio signal is also decoded. The flow then proceeds to 2107.

At 2107, the LFE audio signal is converted into a haptic signal. In certain embodiments, the LFE audio signal can be converted into the haptic signal by pitch-shifting the LFE audio signal, as previously described in conjunction with FIG. 20. In other embodiments, the LFE audio signal can be converted into the haptic signal by frequency-shifting the LFE audio signal, as previously described in conjunction with FIG. 20. The flow then proceeds to 2109.

At 2109, the haptic signal is resampled to a target driving frequency of a haptic output device, such as an actuator. An example target driving frequency is 8 KHz. The flow then proceeds to 2111.

At 2111, the haptic signal is sent to the haptic output device in real-time, where the haptic signal causes the haptic output device to output one or more haptic effects. The flow then ends.

Figure 22:
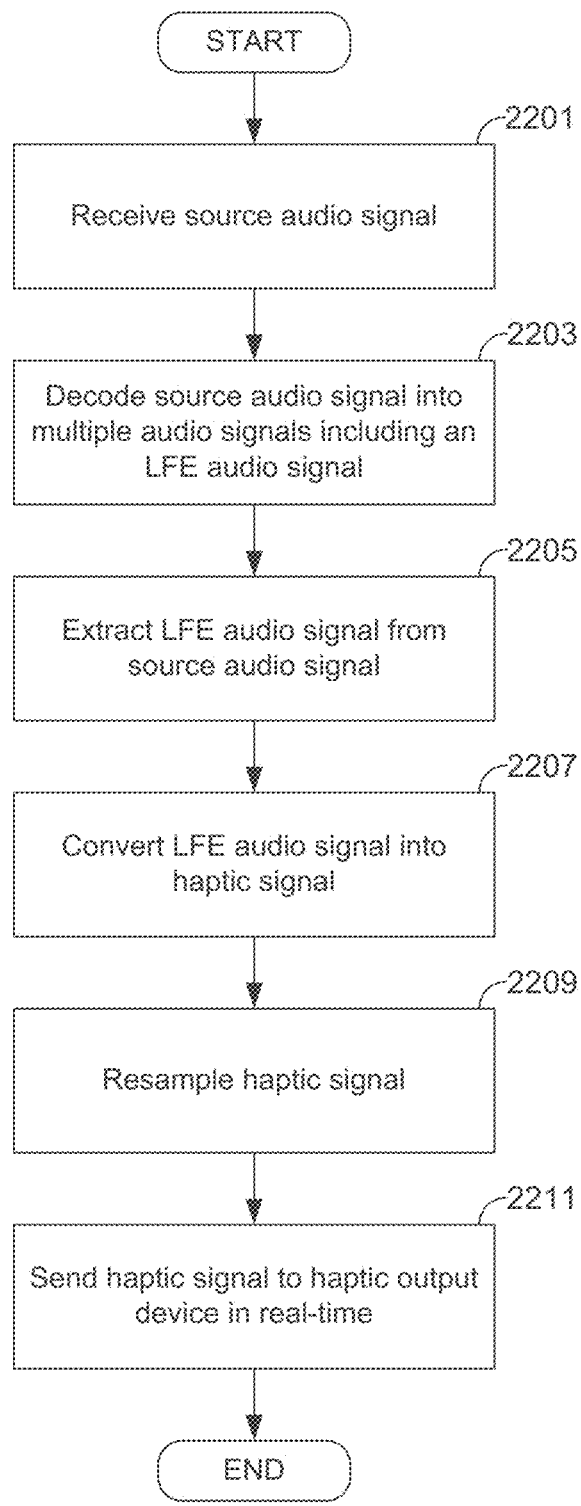
FIG. 22 is a flow diagram for converting an LFE audio signal into a haptic signal according to another embodiment of the invention.

FIG. 22 is a flow diagram for converting an LFE audio signal into a haptic signal according to another embodiment of the invention. The flow begins and proceeds to 2201. At 2201, a source audio signal is received. The source audio signal includes multiple audio signals, where the audio signals can be contained within multiple tracks or channels. At least one of the multiple audio signals can be an LFE audio signal, where the LFE audio signal is contained within an LFE track or LFE channel of the source audio signal. The flow then proceeds to 2203.

At 2203, the source audio signal is decoded into multiple audio signals, where the multiple audio signals includes the LFE audio signal. The flow then proceeds to 2205.

At 2205, the LFE audio signal is extracted from the source audio signal. In certain embodiments where the LFE audio signal is encoded within the source audio signal, the extracted LFE audio signal is also decoded. The flow then proceeds to 2207.

At 2207, the LFE audio signal is converted into a haptic signal. In certain embodiments, the LFE audio signal can be converted into the haptic signal by pitch-shifting the LFE audio signal, as previously described in conjunction with FIG. 20. In other embodiments, the LFE audio signal can be converted into the haptic signal by frequency-shifting the LFE audio signal, as previously described in conjunction with FIG. 20. The flow then proceeds to 2209.

At 2209, the haptic signal is resampled to a target driving frequency of a haptic output device, such as an actuator. An example target driving frequency is 8 KHz. The flow then proceeds to 2211.

At 2211, the haptic signal is sent to the haptic output device in real-time, where the haptic signal causes the haptic output device to output one or more haptic effects. The flow then ends.

Figure 23:
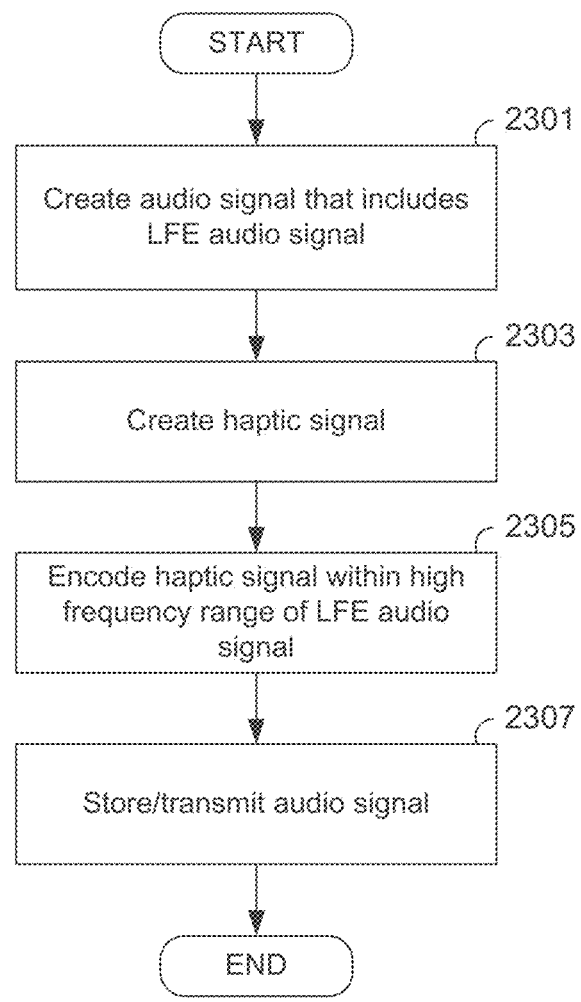
FIG. 23 is a flow diagram for encoding a haptic signal within an LFE audio signal according to an embodiment of the invention.

FIG. 23 is a flow diagram for encoding a haptic signal within a low-frequency effect signal according to an embodiment of the invention. Encoding haptic signals in audio signals can be convenient because content for two different outputs can be recorded, stored, and transmitted in a single waveform, or other type of signal. In the case of an LFE audio signal, an audio signal in a limited frequency range (e.g., 20 Hz-120 Hz) is stored and played back at an audio output device, such as a speaker, with the same frequency range. Thus, according to an embodiment, a haptic signal can be encoded within any band-limited frequency range of an LFE audio signal, such as a high frequency range (e.g., greater than 200 Hz), without interfering with audio data contained within the LFE audio signal. A design of haptic effects that are generated based on the haptic signal can be done in a normal frequency range, such as 1 Hz-200 Hz, but, at a time of encoding the haptic signal in the LFE audio signal, the haptic signal can be shifted to any band-limited frequency range, so it can be stored without interfering with the audio data of the LFE audio signal. One advantage of this encoding is that the haptic signal can be derived directly from the LFE audio signal, or authored by a haptic effect developer, and the haptic signal can be encoded in the same LFE audio signal.

The flow begins and proceeds to 2301. At 2301, an audio signal is created that includes audio data. The audio signal also includes an LFE audio signal. The LFE audio signal can include audio data with one or more frequencies within a limited frequency range, such as 20 Hz-120 Hz. The flow then proceeds to 2303.

At 2303, a haptic signal is created that includes haptic data. The haptic data can include one or more frequencies within a normal frequency range, such as 1 Hz-200 Hz. The flow then proceeds to 2305.

At 2305, the haptic signal is encoded within the LFE audio signal of the audio signal. In certain embodiments, the haptic signal can be encoded within a target frequency range of the LFE audio signal. The target frequency range of the LFE audio signal can be any band-limited frequency range, such as a high frequency range (e.g., greater than 200 Hz). In these embodiments, one or more frequencies of the haptic signal can be shifted from one or more frequencies within the normal frequency range to one or more frequencies within the band-limited frequency range, before the haptic signal is encoded within the band-limited frequency range of the LFE audio signal. In one embodiment, the audio signal can be a Digital Dolby audio signal, and thus, the haptic signal can be encoded with the LFE audio signal of the Digital Dolby audio signal. The flow then proceeds to 2307.

At 2307, the audio signal is either stored within a container or streaming data format of a file, or is transmitted. The flow then ends.

Figure 24:
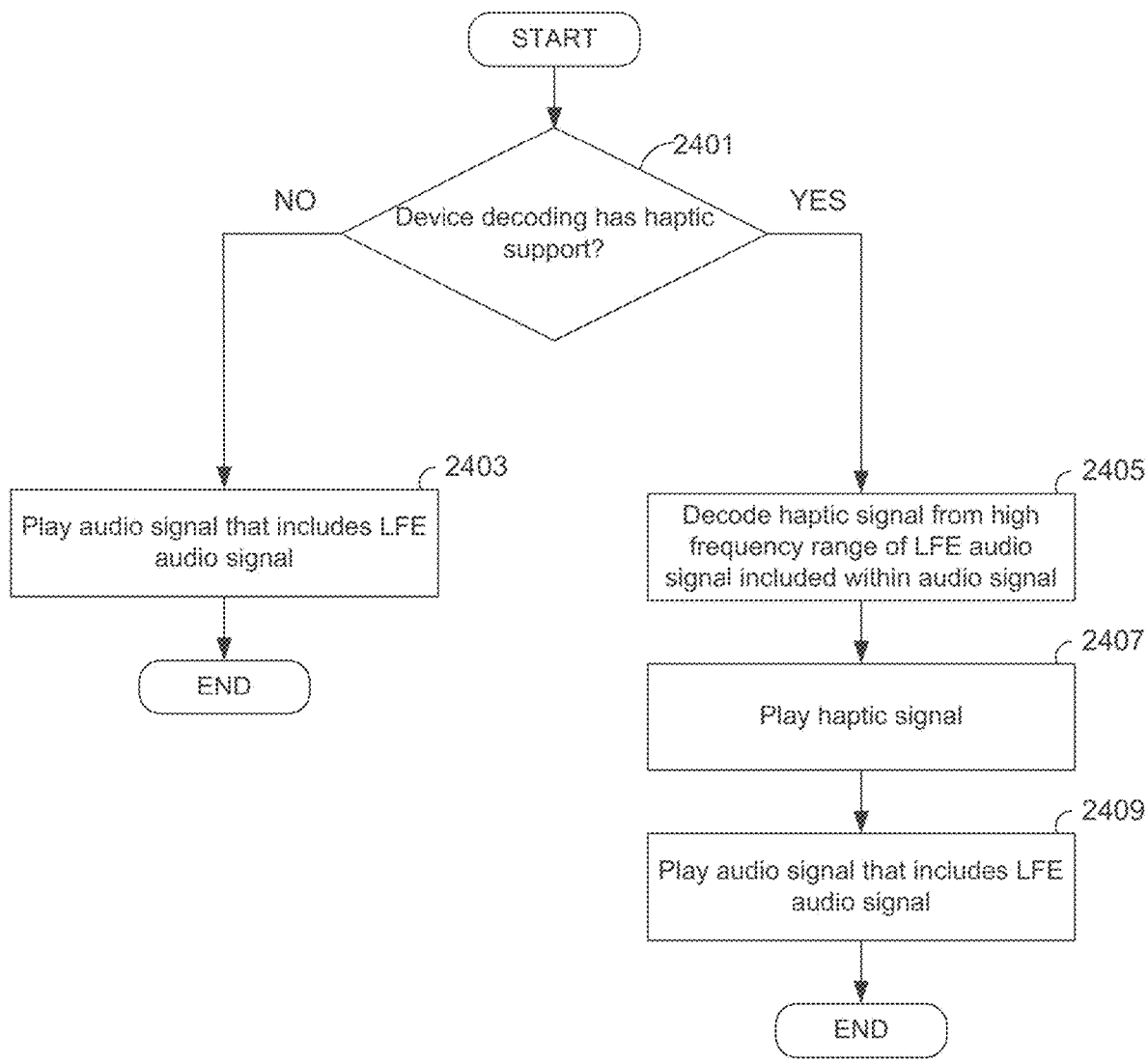
FIG. 24 is a flow diagram for decoding a haptic signal from a low-frequency effect signal according to an embodiment of the invention.

FIG. 24 is a flow diagram for decoding a haptic signal from a low-frequency effect signal according to an embodiment of the invention. As previously described, a design of haptic effects that are generated based on the haptic signal can be done in a normal frequency range, but, at a time of encoding the haptic signal in the LFE audio signal, the haptic signal can be shifted to any band-limited frequency range, so it can be stored without interfering with the audio data of the LFE audio signal. At a time of decoding, a filtering technique can be used to extract the LFE audio signal from an audio signal, and to further extract the haptic signal from the LFE audio signal. The filtering technique can further be used to frequency-shift the haptic signal from the band-limited frequency range to the normal frequency range.

The flow begins and proceeds to 2401. At 2401, it is determined whether a device that performs decoding has haptic support (i.e., whether the device can output haptic effects). If the device does not have haptic support, the flow proceeds to 2403. If the device has haptic support, the flow proceeds to 2405.

At 2403, the audio signal that includes the LFE audio signal is played at an audio output device. In certain embodiments, the audio signal is sent to the audio output device, where the audio signal causes the audio output device to output one or more audio effects. The flow then ends.

At 2405, the haptic signal is extracted from the LFE audio signal of the audio signal and decoded. In certain embodiments, the haptic signal is extracted from a target frequency range of the LFE audio signal. The target frequency range of the LFE audio signal can be any band-limited frequency range, such as a high-frequency range (e.g., greater than 200 Hz). In these embodiments, one or more frequencies of the haptic signal can be shifted from one or more frequencies within the band-limited frequency range to one or more frequencies within a normal frequency range, such as 1 Hz-200 Hz, after the haptic signal is decoded. The flow then proceeds to 2407.

At 2407, the haptic signal is played at a haptic output device. In certain embodiments, the haptic signal is sent to the haptic output device, where the haptic signal causes the haptic output device to output one or more haptic effects. The flow then proceeds to 2409.

At 2409, the audio signal that includes the LFE audio signal is played at an audio output device. In certain embodiments, the audio signal is sent to the audio output device, where the audio signal causes the audio output device to output one or more audio effects. The flow then ends.

Figure 25:
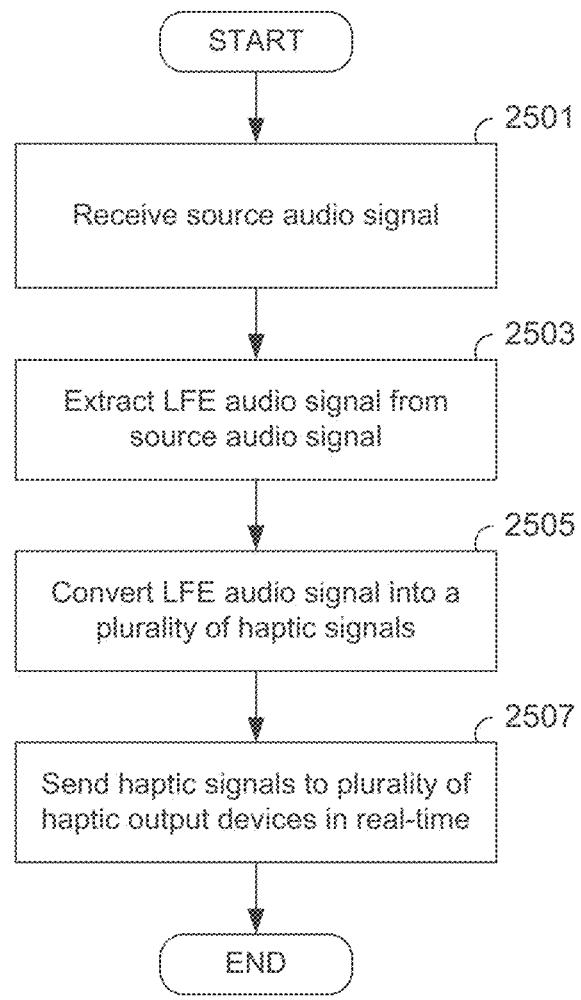
FIG. 25 is a flow diagram for converting an LFE audio signal into a plurality of haptic signals according to an embodiment of the invention.

FIG. 25 is a flow diagram for converting an LFE audio signal into a plurality of haptic signals according to an embodiment of the invention. The flow begins and proceeds to 2501. At 2501, a source audio signal is received. The source audio signal includes multiple audio signals, where the audio signals can be contained within multiple tracks or channels. At least one of the multiple audio signals can be an LFE audio signal, where the LFE audio signal is contained within an LFE track or LFE channel. The flow then proceeds to 2503.

At 2503, the LFE audio signal is extracted from the source audio signal. In certain embodiments where the LFE audio signal is encoded within the source audio signal, the extracted LFE audio signal is also decoded. The flow then proceeds to 2505.

At 2505, the LFE audio signal is converted into a plurality of haptic signals. In certain embodiments, the conversion of the LFE audio signal into the haptic signals can be sequential. In other embodiments, the conversion of the LFE audio signal into the haptic signals can be simultaneous. Further, in certain embodiments, the LFE audio signal can be converted into each haptic signal by pitch-shifting the LFE audio signal. By pitch-shifting the LFE audio signal, an original pitch of the LFE audio signal can be shifted to a target pitch within a target pitch range of a haptic output device, such as an actuator. There can be a plurality of haptic output devices, and each haptic output device can have a distinct target pitch range. Thus, each pitch-shift of the LFE audio signal can shift the original pitch of the LFE audio signal to a target pitch within each distinct target pitch range of each haptic output device. In other embodiments, the LFE audio signal can be converted into each haptic signal by frequency-shifting the LFE audio signal. By frequency-shifting the LFE audio signal, one or more original frequencies of the LFE audio signal can be shifted to one or more target frequencies within a target frequency range of a haptic output device, such as an actuator. There can be a plurality of haptic output devices, and each haptic output device can have a distinct target frequency range. Thus, each frequency-shift of the LFE audio signal can shift the one or more original frequencies of the LFE audio signal to one or more target frequencies within each distinct target frequency range of each haptic output device. The flow then proceeds to 2507.

At 2507, the haptic signals are sent to the haptic output devices in real-time, where each haptic signal causes the corresponding haptic output device to output one or more haptic effects. In an alternate embodiment, each haptic signal is encoded in a container, or streaming data format, of a file which supports haptic data encoding. In certain embodiments, at least one haptic signal is encoded within the LFE audio signal. Each haptic signal can subsequently be extracted from the container, decoded, and sent to the corresponding haptic output device, where each haptic signal causes the corresponding haptic output device to output one or more haptic effects. The flow then ends.

Figure 26A:
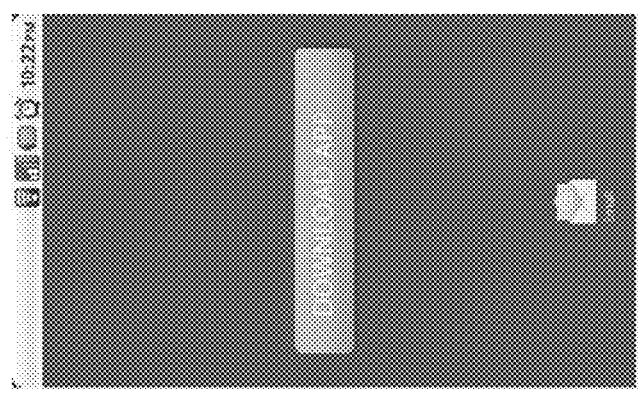
FIGS. 26A-26D are screen views of example foreground and background haptic applications according to one embodiment of the invention.
Figure 26B:
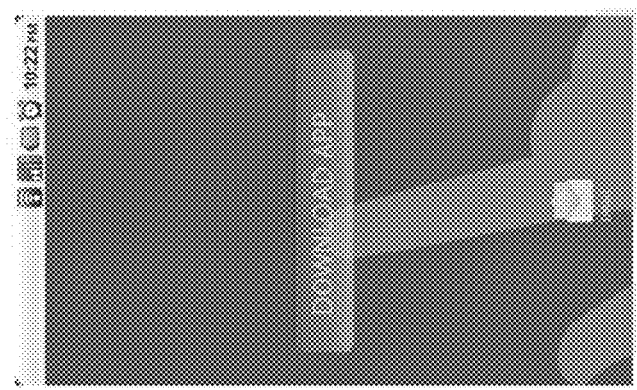
Figure 26C:
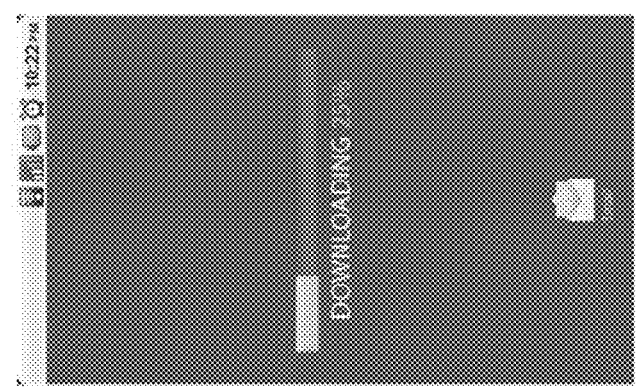

FIGS. 26A-26D are screen views of example foreground and background haptic applications according to one embodiment of the invention. It will be recognized that more than one haptic enabled software application may be running simultaneously on a device having a haptic actuator, and that a window on the top of a virtual windows environment may overlap or obscure portions of any windows that are on the bottom. FIG. 26A shows a screen view of an example application window having a virtual download application button located in the center of the screen. In FIG. 26B the user selects the download application button, whereupon FIG. 26C shows a new screen view having a status bar in the center of the screen which indicates the percentage completion of the download. The status bar changes color proportionally from left to right corresponding to the percentage completion text shown directly below the status bar. Because the status bar is haptified, a haptic effect signal is generated and output to the haptic actuator concurrently with the visual display of the status bar. In one embodiment, the haptic effect signal changes over time corresponding to the percentage completion of the download.

Figure 26D:
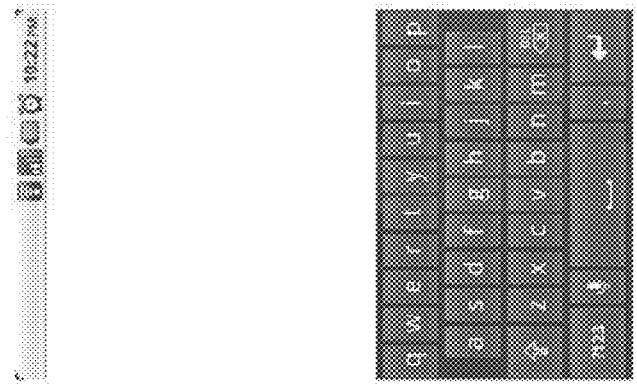

FIG. 26D shows a screen view of a text input window. The text input window, selected by the user as the active window, is running in the foreground and completely obscures the download application status bar which is running simultaneously in the background. Although the download application window is no longer the active window and the status bar is completely obscured on the visual display, the status bar haptic effect signal continues to be generated and output to the haptic actuator as a background haptic effect. Because the text input window is also haptified, a foreground haptic effect signal is generated and output to the haptic actuator for each typed character concurrently with the visual display of the typed character in the text input window. In one embodiment, the foreground and background haptic effect signals are combined, modified or synthesized in such a way that the user perceives the foreground and background haptic effects as being distinct haptic effects even though they are both being output concurrently via a single haptic actuator.

The perception of a haptic effect has three different levels. The first level is the threshold of perception, which is the minimum applied haptic effect signal component or components required for a user to detect the haptic effect. Such haptic components include, but are not limited to, strength, frequency, duration, rhythm and dynamics of the haptic effect signal. It will be recognized that the threshold of haptic perception may be highly non-linear and may vary greatly between users, and may even vary for a single user depending on many factors such as the user's sensitivity to touch, how tightly the user may be holding a handheld device, the ambient temperature, the user's age, or the user's physical activity or environment such as walking or riding in a vehicle, and so on.

The second level of haptic effect perception is the threshold of attention break-in, which is the minimum change in the applied haptic effect signal that results in drawing the user's attention away from the primary focus to the attention break-in haptic effect itself. It will be recognized that the threshold of attention break-in may vary between users or for a single user depending on many factors as described above, and may also vary depending on whether the attention break-in is related to various types of haptic effects including a positive additive effect, or a negative subtractive effect, or a change in the haptic effect. The third level of haptic effect perception is the threshold of pain, which also varies between users or for a single user depending on many factors as described above. It will be recognized that under some circumstances, the threshold of perception may be the same as the threshold of attention break-in, which may also be the same as the threshold of pain.

Embodiments of the invention are compatible with a wide variety of haptic actuators, and can present multiple channels of haptic effect data with different intensity levels. In one embodiment, the multiple channels are represented by a foreground channel and one or more background channels. A background haptic effect is any haptic effect or haptic effect component which meets or exceeds the threshold of perception. A foreground haptic effect is any haptic effect or haptic effect component which meets or exceeds the threshold of attention break-in. In one embodiment, a foreground or background haptic effect may be a defined set of static or dynamic haptic effects or effect components. In another embodiment, a foreground or background haptic effect may be an adaptive set of static or dynamic haptic effects or haptic effect components in response to user input, system input, device sensor input or ambient input.

Using multiple haptic channels, such as foreground and background channels, enables subtle haptic effects to be provided concurrently with more obvious haptic effects, allowing a user to distinguish between the different effects and identifying them as originating from different sources. In one embodiment, low-importance or high-density information is perceivable, but not overwhelming or distracting from a primary task, and multiple channels further enable haptic ambient awareness. For example, a haptic enabled handheld or mobile device which is monitoring the local weather during a rainstorm activates a background haptic channel to provide a sensation of raindrops that increases or decreases as it rains harder or softer.

In one embodiment, foreground and background channels are used to distinguish the feedback originating from a local device and the feedback originating from another user. For example, a message notification arriving from another user activates a foreground haptic effect, while the status of a ticking clock on the local device activates a background haptic effect.

In one embodiment, foreground and background channels are used to distinguish the feedback originating from a local device and the feedback originating from a primary user. For example, the feedback originated by a primary user typing on a haptic enabled keyboard activates a foreground haptic effect, while the status of a progress bar on the local device activates a background haptic effect.

In one embodiment, foreground and background channels are used to distinguish the feedback within or between virtual simulations or animations. For example, the motion of a virtual rolling ball activates a foreground haptic effect, while the virtual texture the ball is rolling on activates a background haptic effect.

In one embodiment, background haptic effects are additive such that when multiple background effects are received concurrently or in quick succession, the overall result is a natural or gradual foregrounding of the haptic effects. For example, a single background text message "tweet" notification received from a non-primary user may be easily missed or ignored by the primary user, but when hundreds or thousands of message notifications constituting a "tweet storm" are received in a short amount of time, the multiple haptic effects add up and the overall result is a haptic experience in the foreground which draws the primary user's attention to the event.

In one embodiment, background haptic effects are used to provide non-distracting or "polite" augmentation of a commercial advertisement or any other type of haptic encoded content. For example, an advertisement for a carbonated soft drink provides a background haptic "fizz" effect that can be felt if the user is paying attention but otherwise can be easily ignored.

It will be recognized that any type of input such as user, device, system, application or network input may be represented by any number of haptic events on one or more foreground or background haptic channels. Examples include, but are not limited to, multi-tasking applications, incoming email, "tweet" message notifications, passive notifications, outgoing messages, progress bars, Bluetooth or local device pairings, network add or drop connection, continuous antenna signal level, and so on.

FIGS. 27A and 27B are display graphs of example multiple data channels of haptic feedback according to one embodiment of the invention. FIG. 27A shows a graph of the perceptual magnitude of a haptic signal over time for priority based haptic events, along with a corresponding graph of notification activity. At time T1, the perceptual magnitude of a haptic signal 2701 corresponding to the medium priority notifications N1 and N2 starts in the background channel 2703. Upon receipt of a high priority notification N3, at time T2 the haptic signal 2701 begins to rise until at time T3 the haptic signal 2701 crosses the threshold from the background channel 2703 into the foreground channel 2705. The haptic signal 2701 continues to increase up to a peak level 2707, where in the absence of any further notifications the haptic signal 2701 decreases and crosses the threshold from the foreground channel 2705 to the background channel 2703 at time T4.

At time T5, receipt of a high priority notification once again causes the haptic signal 2701 to rise until at time T6 the haptic signal 2701 crosses the threshold from the background channel 2703 into the foreground channel 2705. The haptic signal 2701 continues to increase up to a peak level 2709, where in the absence of any further notifications the haptic signal 2701 decreases and crosses the threshold from the foreground channel 2705 to the background channel 2703 at time T7. It will be recognized that a stream of low-priority or medium-priority notifications punctuated with high-priority notifications results in a haptic signal 2701 that shifts between the background channel 2703 and foreground channel 2705 without limitation.

FIG. 27B shows a graph of the perceptual magnitude of a haptic signal over time for frequency based haptic events, along with a corresponding graph of notification activity. At time T8, the perceptual magnitude of a haptic signal 2711 corresponding to the relatively infrequent notifications N1 through N3 starts in the background channel 2713. Upon receipt of higher frequency notifications, at time T9 the haptic signal 2711 begins to rise until at time T10 the haptic signal 2711 crosses the threshold from the background channel 2713 into the foreground channel 2715. With continuing receipt of higher frequency notifications, the haptic signal 2711 continues to increase up to a peak level 2717, where in the absence of any further notifications the haptic signal 2711 decreases and crosses the threshold from the foreground channel 2715 to the background channel 2713 at time T11. It will be recognized that a stream of low-frequency notifications punctuated with high-frequency notifications results in a haptic signal 2711 that shifts between the background channel 2713 and foreground channel 2715 without limitation. In one embodiment, priority based haptic events and frequency based haptic events may be interspersed with each other or received at any time or in any order, and may be used in any manner to generate an overall combined haptic signal.

Figure 28:
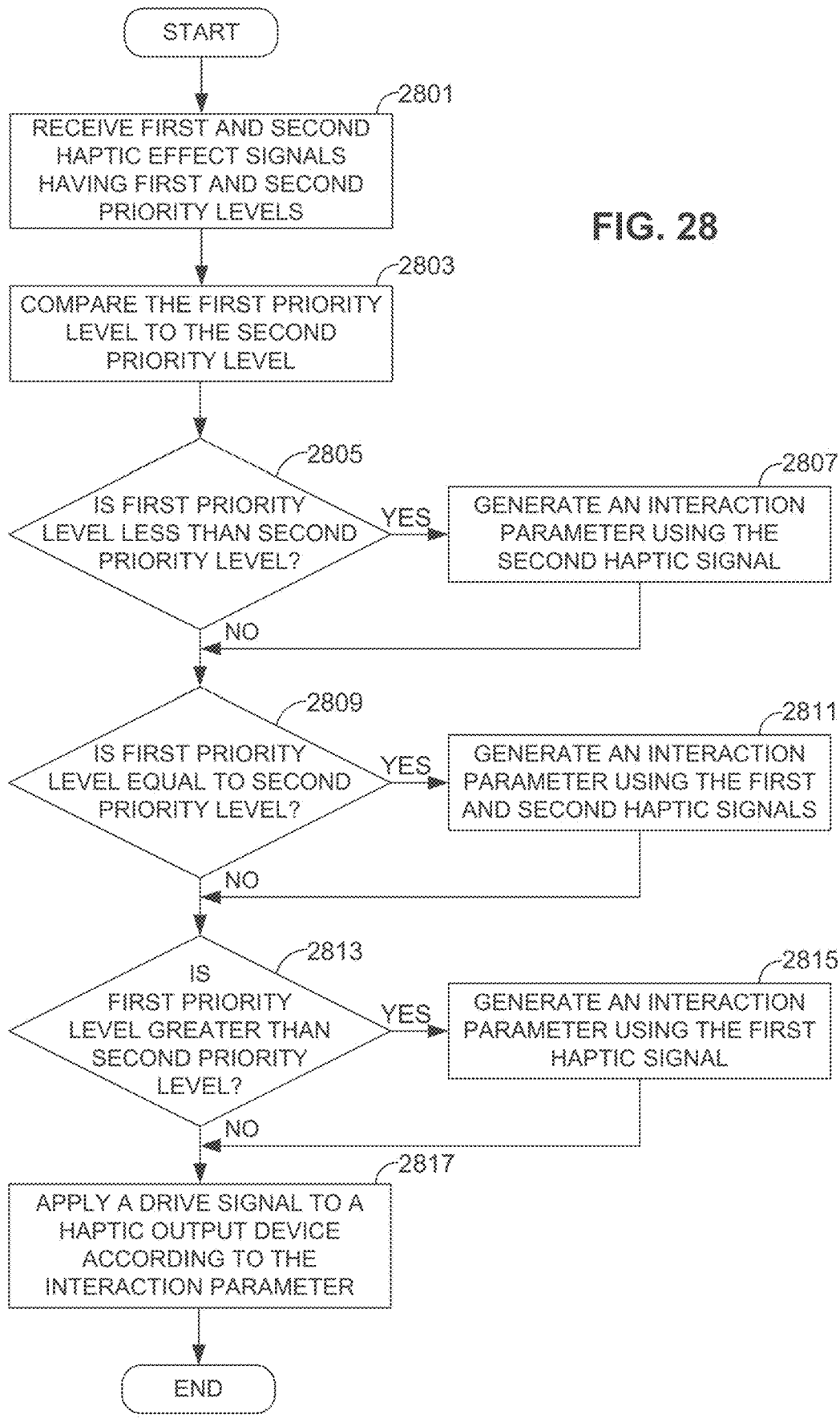
FIG. 28 is a flow diagram for displaying multiple data channels of haptic feedback for priority based haptic events according to one embodiment of the invention.

FIG. 28 is a flow diagram for displaying multiple data channels of haptic feedback for priority based haptic events according to one embodiment of the present invention. At 2801, the system receives input of first and second haptic effect signals having first and second priority levels. It will be recognized that any type or number of priority levels may be used, such as foreground and background priority levels, or any number of alpha-numeric or any other sequential or non-sequential priority levels, without limitation. The first and second haptic effect signals may be received in any order or time sequence, either sequentially with non-overlapping time periods or in parallel with overlapping or concurrent time periods. At 2803, the system compares the first priority level to the second priority level. If at 2805 the first priority level is less than the second priority level, at 2807 an interaction parameter is generated using the second haptic signal. It will be recognized that any type of input synthesis method may be used to generate the interaction parameter from one or more haptic effect signals including, but not limited to, the method of synthesis examples listed in TABLE 1 below. If at 2809 the first priority level is equal to the second priority level, at 2811 an interaction parameter is generated using the second haptic signal. If at 2813 the first priority level is greater than the second priority level, at 2815 an interaction parameter is generated using the second haptic signal. At 2817, a drive signal is applied to a haptic actuator according to the interaction parameter.

TABLE 1—METHODS OF SYNTHESIS

Figure 29:
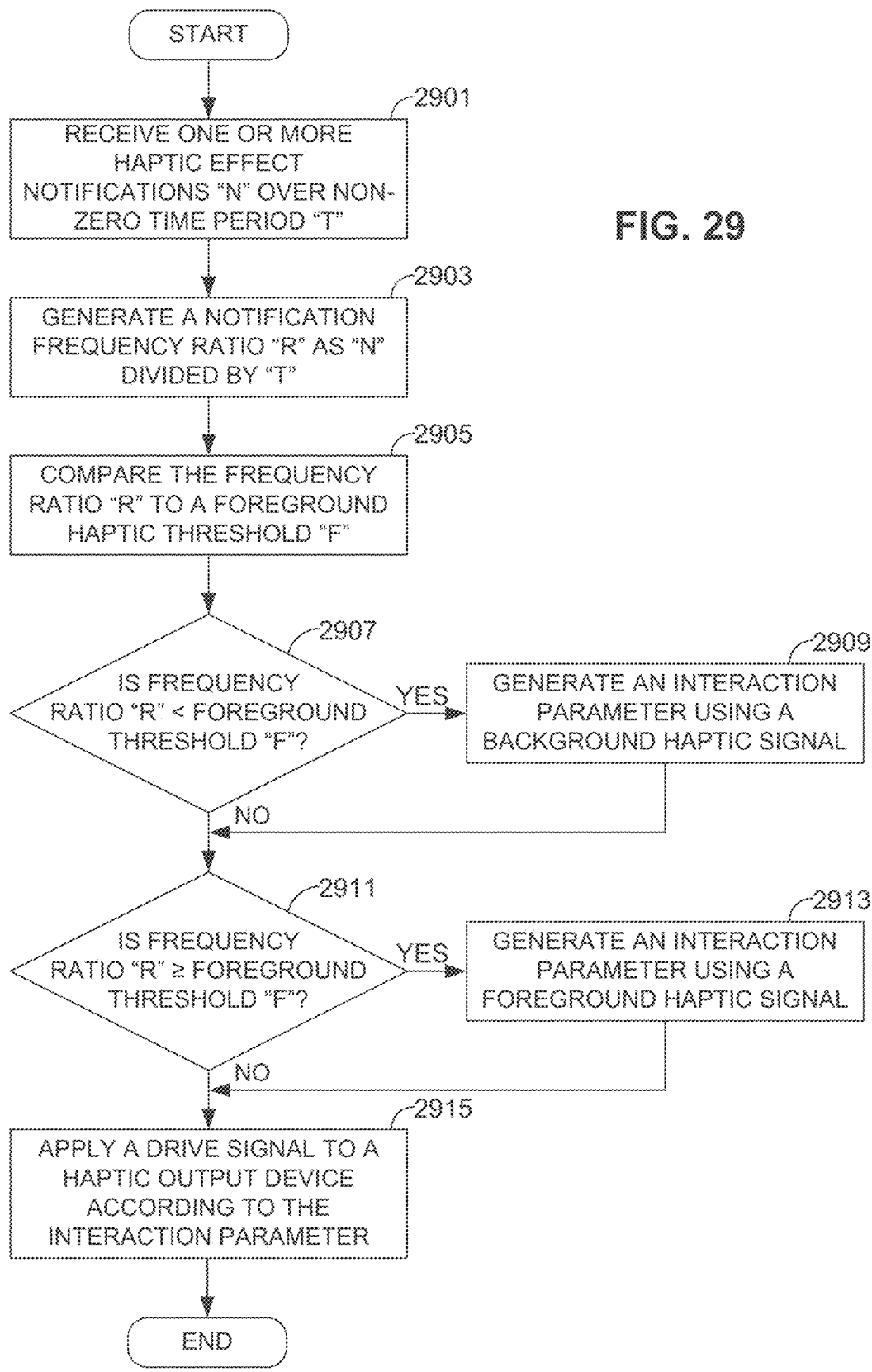
FIG. 29 is a flow diagram for displaying multiple data channels of haptic feedback for priority based haptic events according to one embodiment of the invention.

Additive synthesis—combining inputs, typically of varying amplitudes
Subtractive synthesis—filtering of complex signals or multiple signal inputs
Frequency modulation synthesis—modulating a carrier wave signal with one or more operators
Sampling—using recorded inputs as input sources subject to modification
Composite synthesis—using artificial and sampled inputs to establish a resultant "new" input
Phase distortion—altering the speed of waveforms stored in wavetables during playback
Waveshaping—intentional distortion of a signal to produce a modified result
Resynthesis—modification of digitally sampled inputs before playback
Granular synthesis—combining of several small input segments into a new input
Linear predictive coding—similar technique as used for speech synthesis
Direct digital synthesis—computer modification of generated waveforms
Wave sequencing—linear combinations of several small segments to create a new input
Vector synthesis—technique for fading between any number of different input sources
Physical modeling—mathematical equations of the physical characteristics of virtual motion FIG. 29 is a flow diagram for displaying multiple data channels of haptic feedback for frequency based haptic events according to one embodiment of the present invention. At 2901, the system receives one or more haptic effect notifications N over a non-zero time period T. At 2903, the system generates a notification frequency ratio R, calculated by using at least the number of haptic effect notifications N and the non-zero time period T. In one embodiment, the notification frequency ratio R is calculated as N divided by T. At 2905, the system compares the notification frequency ratio R to a foreground haptic threshold F. Haptic threshold F may be static or dynamic and may vary over time depending on many factors such as the user's sensitivity to touch, how tightly the user may be holding a handheld device, the ambient temperature, the user's age, or the user's physical activity or environment such as walking or riding in a vehicle, and so on. It will be recognized that the notification frequency ratio R may be directly calculated or may be normalized corresponding to a wide range of variation for the haptic threshold F, and that the haptic threshold F may be directly calculated or may be normalized corresponding to a wide range of variation for the notification frequency ratio R.

If at 2907 the notification frequency ratio R is less than the foreground haptic threshold F, at 2909 an interaction parameter is generated using a background haptic signal. If at 2911 the notification frequency ratio R is greater than or equal to the foreground haptic threshold F, at 2913 an interaction parameter is generated using a foreground haptic signal. At 2915, a drive signal is applied to a haptic actuator according to the interaction parameter.

Figure 30:
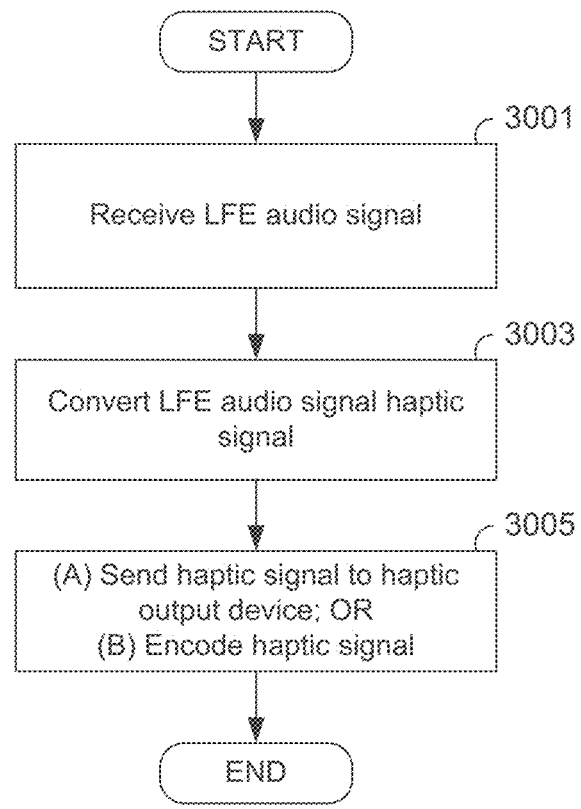
FIG. 30 is a flow diagram for converting an LFE audio signal into a haptic signal according to another embodiment of the invention.

FIG. 30 is a flow diagram for converting an LFE audio signal into a haptic signal according to another embodiment of the invention. The flow begins and proceeds to 3001. At 2501, an LFE audio signal is received. The flow then proceeds to 3003.

At 3003, the LFE audio signal is converted into a haptic signal. In certain embodiments, the LFE audio signal is transformed, and the transformed LFE audio signal can be used as the haptic signal. The flow then proceeds to 2507.

At 3005, either: (a) the haptic signal is sent to a haptic output device, where the haptic signal causes the haptic output device to output one or more haptic effects; or (b) the haptic signal is encoded in a container, or streaming data format, of a file which supports haptic data encoding. In certain embodiments where the haptic signal is encoded, the haptic signal is encoded within the LFE audio signal. Further, in embodiments where the haptic signal is encoded, the haptic signal can subsequently be extracted from the container, decoded, and sent to the haptic output device, where the haptic signal causes the haptic output device to output one or more haptic effects. The flow then ends.

Thus, in one embodiment, a system can extract an LFE audio signal from a source audio signal, and convert the LFE audio signal into a haptic signal. The haptic signal can then be sent to a haptic output device, such as an actuator, where the haptic signal can cause the haptic output device to output one or more haptic effects. The system can coordinate the output of the one or more haptic effects with the output of the source audio signal, which can result is an enhanced experience from a perspective of a user, who experiences both the audio content and the haptic content. Further, by only converting a component of the source audio signal (i.e., the LFE audio signal), rather than the entire source audio signal, the system is less computationally intensive than systems that convert the entire source audio signal. Further, in another embodiment, the system can encode the haptic signal within the LFE audio signal of the audio signal. Using the LFE audio signal can reduce the complexity of an overall architecture to encode, store, transmit, and decode haptic signals. The only addition to the audio signal is the haptic data added to a band-limited frequency range of the LFE audio signal of the audio signal, such as a high frequency range. However, this additional data does not affect the LFE audio data, since the audio output devices typically do not have the capability of outputting the band-limited frequency data, such as high-frequency data. Therefore, this encoding can be backward-compatible with non-haptic playback devices. Another advantage of the encoding is that the same audio effects designer can design the LFE audio effects as well as the haptic effects in the same signal. The signal can subsequently be distributed and played back accordingly.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for generating multiple haptic effects, the method comprising:
    receiving a first haptic effect signal having a first priority and corresponding to a first haptic effect;
    receiving a second haptic effect signal having a second priority and corresponding to a second haptic effect;
    performing an input synthesis of the first haptic effect signal and the second haptic effect signal to determine a drive signal configured to cause the first haptic effect and the second haptic effect to be generated concurrently, wherein
        when the first priority is less than the second priority, the input synthesis is performed based on the second haptic effect signal, and
        when the second priority is less than the first priority, the input synthesis is performed based on the first haptic effect signal; and
    applying the drive signal to a haptic output device to generate the first haptic effect and the second haptic effect concurrently.

2. The method of claim 1, wherein the input synthesis comprises granular synthesis.

3. The method of claim 1, wherein the input synthesis comprises linear predictive coding.

4. The method of claim 1, wherein the first haptic effect signal comprises a background haptic effect and the second haptic effect signal comprises a foreground haptic effect, wherein the first priority is less than the second priority.

5. The method of claim 1, wherein the first haptic effect signal corresponds to a first window in a graphical user interface and the second haptic effect signal corresponds to a second window in the graphical user interface, wherein the first window overlays at least a portion of the second window and the first window has a higher priority than the second window.

6. The method of claim 1, wherein the haptic output device is a single actuator, and the first haptic effect is distinguishable from the second haptic effect when generated concurrently.

7. A non-transitory computer-readable medium having instructions stored thereon that, when executed by a processor, cause the processor to generate multiple haptic effects by:
    receiving a first haptic effect signal having a first priority and corresponding to a first haptic effect;
    receiving a second haptic effect signal having a second priority and corresponding to a second haptic effect;
    performing an input synthesis of the first haptic effect signal and the second haptic effect signal to determine a drive signal configured to cause the first haptic effect and the second haptic effect to be generated concurrently, wherein
        when the first priority is less than the second priority, the input synthesis is performed based on the second haptic effect signal, and
        when the second priority is less than the first priority, the input synthesis is performed based on the first haptic effect signal; and
    applying the drive signal to a haptic output device to generate the first haptic effect and the second haptic effect concurrently.

8. The non-transitory computer-readable medium of claim 7, wherein the input synthesis comprises granular synthesis.

9. The non-transitory computer-readable medium of claim 7, wherein the input synthesis comprises linear predictive coding.

10. The non-transitory computer-readable medium of claim 7, wherein the first haptic effect signal comprises a background haptic effect and the second haptic effect signal comprises a foreground haptic effect, wherein the first priority is less than the second priority.

11. The non-transitory computer-readable medium of claim 7, wherein the first haptic effect signal corresponds to a first window in a graphical user interface and the second haptic effect signal corresponds to a second window in the graphical user interface, wherein the first window overlays at least a portion of the second window and the first window has a higher priority than the second window.

12. The non-transitory computer-readable medium of claim 7, wherein the haptic output device is a single actuator, and the first haptic effect is distinguishable from the second haptic effect when generated concurrently.

13. A haptically enabled system comprising:
    a processor;
    a storage device coupled to the processor and storing instructions; and
    a haptic output device coupled to the processor;
    wherein the processor, in response to receiving a first haptic effect signal having a first priority and corresponding to a first haptic effect, and receiving a second haptic effect signal having a second priority and corresponding to a second haptic effect:
        performs an input synthesis of the first haptic effect signal and the second haptic effect signal to determine a drive signal configured to cause the first haptic effect and the second haptic effect to be generated concurrently, wherein when the first priority is less than the second priority, the input synthesis is performed based on the second haptic effect signal, and when the second priority is less than the first priority, the input synthesis is performed based on the first haptic effect signal; and applies the drive signal to a haptic output device to generate the first haptic effect and the second haptic effect concurrently.

14. The system of claim 13, wherein the input synthesis comprises one of linear predictive coding, granular synthesis, additive synthesis, subtractive synthesis or frequency modulation synthesis.

15. The system of claim 13, wherein the first haptic effect signal comprises a background haptic effect and the second haptic effect signal comprises a foreground haptic effect, wherein the first priority is less than the second priority.

16. The system of claim 13, wherein the first haptic effect signal corresponds to a first window in a graphical user interface and the second haptic effect signal corresponds to a second window in the graphical user interface, wherein the first window overlays at least a portion of the second window and the first window has a higher priority than the second window.

17. The system of claim 13, wherein the haptic output device is a single actuator, and the first haptic effect is distinguishable from the second haptic effect when generated concurrently.

* * * * *